United States Patent [19]
Nakamura et al.

[11] Patent Number: 5,485,203
[45] Date of Patent: Jan. 16, 1996

[54] COLOR MISREGISTRATION EASING SYSTEM WHICH CORRECTS ON A PIXEL OR BLOCK BASIS ONLY WHEN NECESSARY

[75] Inventors: Kazunari Nakamura, Hino; Kenji Matsunaka; Akira Watanabe, both of Hachioji, all of Japan

[73] Assignee: Olympus Optical Co., Ltd., Tokyo, Japan

[21] Appl. No.: 925,498

[22] Filed: Aug. 5, 1992

[30] Foreign Application Priority Data

Aug. 12, 1991 [JP] Japan ..................................... 3-201970
Sep. 17, 1991 [JP] Japan ..................................... 3-236624
Sep. 17, 1991 [JP] Japan ..................................... 3-236628
Sep. 20, 1991 [JP] Japan ..................................... 3-241949

[51] Int. Cl.$^6$ ................................................. H04N 9/093
[52] U.S. Cl. ........................ 348/263; 348/70; 348/269; 348/248; 348/576
[58] Field of Search .................... 358/42, 51, 36, 358/37, 98; 348/70, 263, 269, 29, 30, 248, 71, 576, 577; 128/6, 4; H04N 7/18, 11/08, 9/093, 9/64

[56] References Cited

U.S. PATENT DOCUMENTS

4,694,329  9/1987  Belmares-Sarabia et al. ......... 348/577
5,330,010  7/1994  Nakamura et al. ..................... 348/263
5,339,159  8/1994  Nakamura et al. ..................... 348/71

*Primary Examiner*—James J. Groody
*Assistant Examiner*—Cheryl Cohen
*Attorney, Agent, or Firm*—Armstrong, Westerman, Hattori, McLeland & Naughton

[57] ABSTRACT

An encoder decomposes an input color image signal into a luminance signal and color signals, places the color signals in image memories, then fetches color signals of a given screen before and after. A detector calculates differences between the color signals to detect color misregistration either on a pixel basis or a block basis. On the other hand, color signals of a last image acquired before occurrence of color misregistration are stored in frame memories. When color misregistration is detected, a corrector reads the color signals of the last image from the frame memories, and produces correction signals. A counter carries out counting for each difference between color signals of given screens before and after, then detects a distribution of color misregistration of a screen. A selector checks the distribution of color misregistration of a screen to identify the cause of color misregistration, then selectively outputs either the input color image signal or a correction signal sent from the corrector. Thereby, color misregistration is corrected either on a pixel basis or a block basis. This prevents deterioration of image quality due to unnecessary correction.

14 Claims, 25 Drawing Sheets

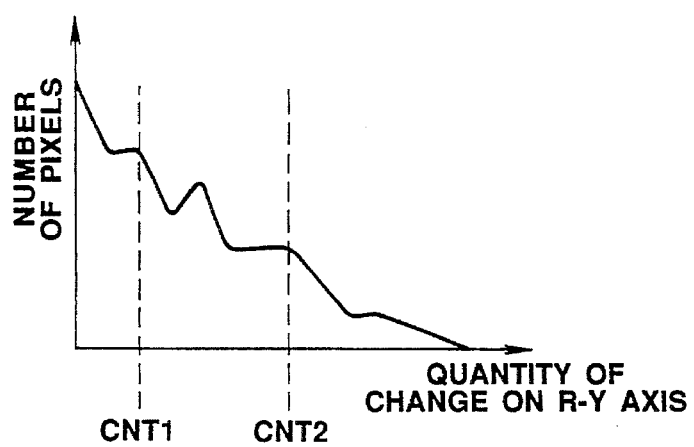
FIG.2(a)
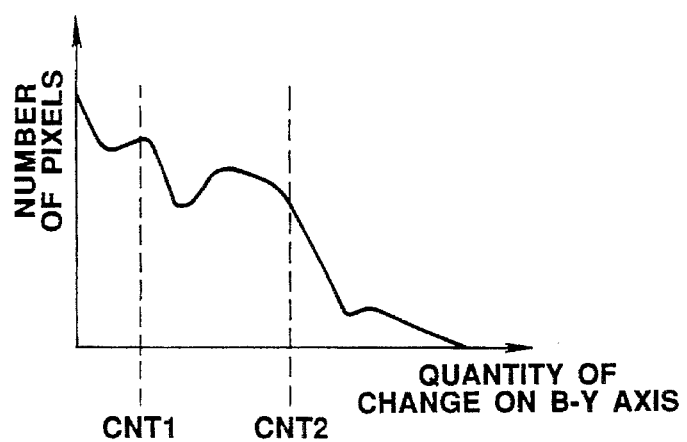
FIG.2(b)
FIG.3
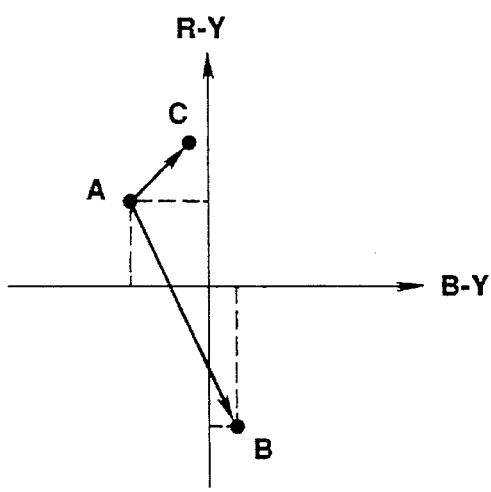

WATER SUPPLY TUBE

FIG.23(a)　　FIG.23(b)
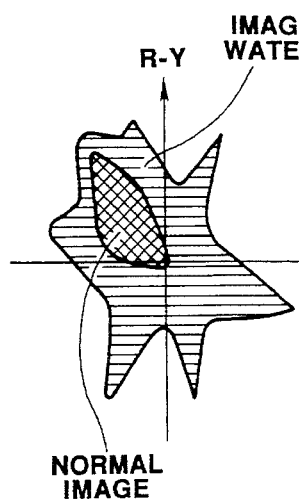
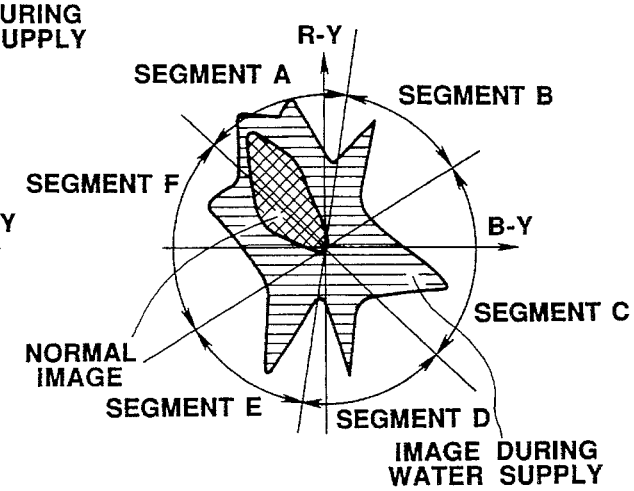
FIG.24(a)　　FIG.24(b)
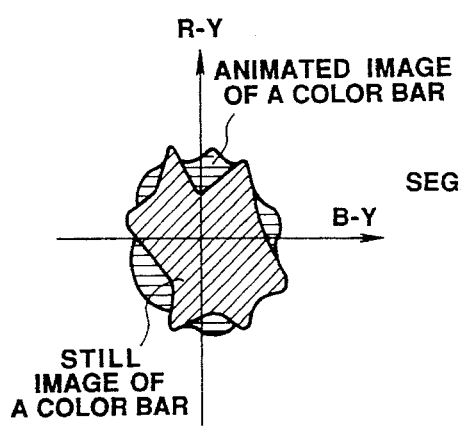
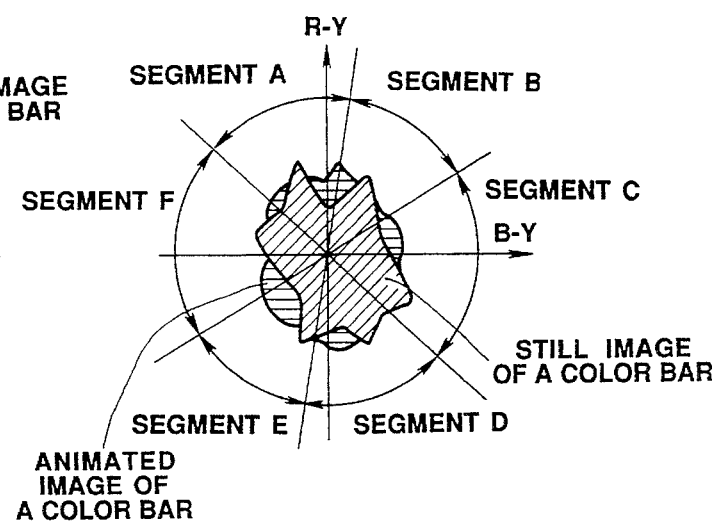

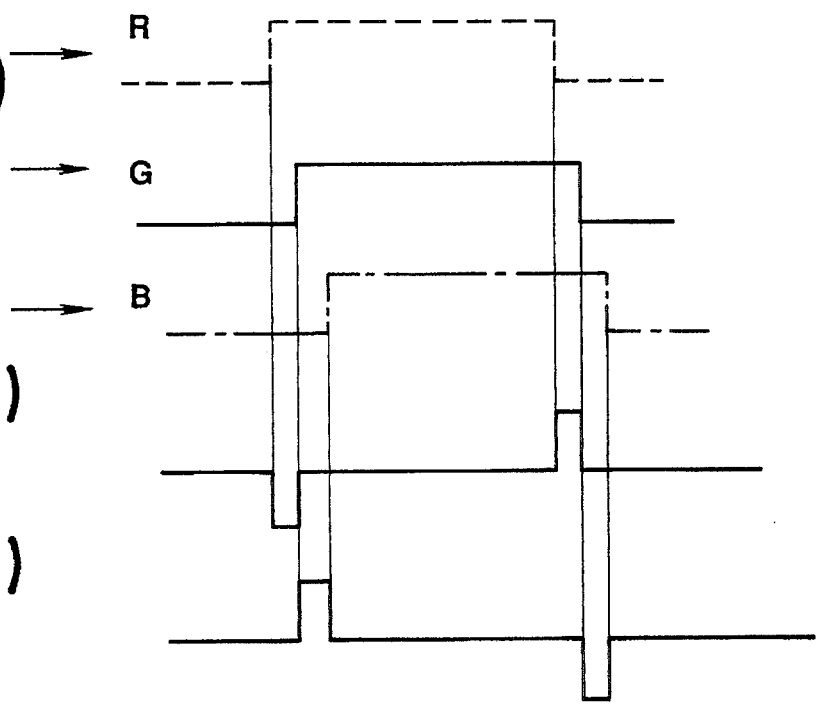
FIG.29(a)
FIG.29(b)
FIG.29(c)
FIG.30
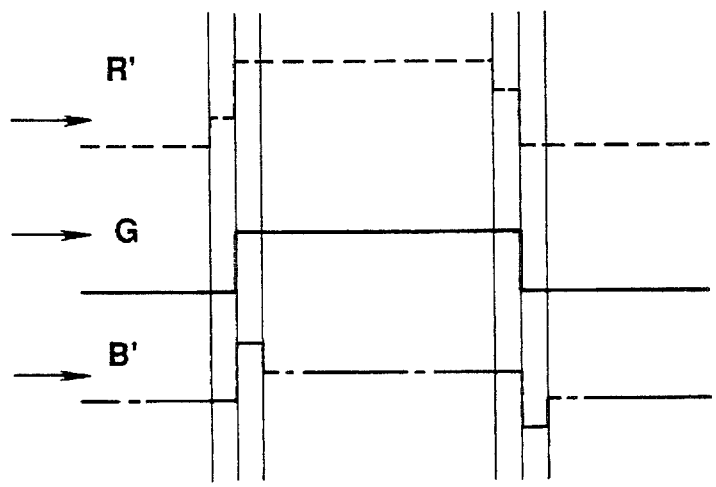

1

COLOR MISREGISTRATION EASING SYSTEM WHICH CORRECTS ON A PIXEL OR BLOCK BASIS ONLY WHEN NECESSARY

BACKGROUND OF THE INVENTION

1. Field of the Invention:

The present invention relates to a color misregistration easing system for easing color misregistration derived from field sequential imaging.

2. Description of the Related Art:

An endoscope whose elongated insertion tube is inserted into a living body to observe a lesion or other subject has been widely adopted in recent years.

An electronic endoscope system employing a CCD or other solid state imaging device as an imaging means has recently come into practical use.

The electronic endoscope includes a field-sequential type electronic endoscope. Herein, a subject is illuminated with illumination light or red, green, and blue rays having different wavelengths, and imaged under the illumination light. Then, produced images or component images are synthesized to form a single color image.

In this method, component images produced at different times are synthesized to form a single color image. When a moving subject is imaged or an imaging means and a subject are moving relate to one another, a synthetic color image usually has colors different from the original color of the subject.

During endoscopic examination, a mucosa may adhere to an objective at the tip of an endoscope. This hinders accurate observation of images. In this case, water supply is performed; water is injected from the distal end of the endoscope toward the objective in order to clean the lens. During the supply of water, water runs fiercely in front of the objective. When the water is illuminated with field sequential illumination light, the water image is produced with greatly-changed colors or to rainbow-colored. Some endoscopes supply water to wash and cool a subject lesion. FIG. 33 shows the process of color misregistration.

The principles of causing such a color reproduction error will be described in conjunction with FIG. 33. When water is supplied from the distal end of an endoscope, water runs quickly in front of an objective. Then, with red (R) illumination light, for example, the water appears as red water (object) just coming out of the distal end of the endoscope. With green (G) light, a waterdrop moving on the lens surface is visualized as a green object. With blue (B) light, a blue water image is seen having moved farther. On the monitor, a synthetic image of these color images is displayed.

Therefore, a water image is displayed as a primary color image of red, green, blue, yellow, cyan, and magenta with a high saturation. That is to say, the water image is rainbow-colored, causing a doctor to suffer fatigued eyes. This drawback or a color reproduction error attributable to different sampling times of color information is referred to as color misregistration.

In an effort to overcome the drawback, the present applicant has proposed prior art in Japanese Patent Application No. 2-70644. Herein, color component signals are checked to identify color misregistration. Then, when color misregistration is identified, false color signals are supplied together with a real luminance to ease the color misregistration.

In Japanese Patent Application No. 2-27842 (U.S. Pat. No. 5,032,913), the applicant has proposed installation of a water supply detecting means that uses an image signal from an electronic endoscope to identify color misregistration due to water supply. Only when color misregistration derive from water supply is identified, a false color is output. Thus, only intense color misregistration is eased.

Japanese Patent Laid-Open No. 3-24513 has disclosed a color misregistration detector for a field-sequential color misregistration easing system. Herein, a current image is used to generate color difference signals, then the hue is calculated. After that, the hue component is held.

A region with water supplied or another region causing conspicuous color misregistration has a high saturation. In a general image, bleeding appears with a relatively high saturation.

In such a color misregistration detecting method, only a hue component, is used to detect color misregistration. Color misregistration is detected irrelative to the degree. Even negligible color misregistration not usually discerned by an observer is corrected. Color misregistration is detected at a level inconsistent with a level at which a sensory test has revealed that an observer discerns color misregistration. Even indiscernible color misregistration is corrected, deteriorating the quality of observation images.

When color misregistration is detected, color misregistration correction has typically been applied to an entire screen. However, during, for example, the water supply operation or the suction operation, significant color misregistration occurs in part of a screen but color misregistration in the other part is often indiscernible. That is to say, since color misregistration correction is uniformly performed over an entire screen, correction Is applied to portions that need not be corrected. As a result, the corrected image appears unnatural.

SUMMARY OF THE INVENTION

One object of the present invention is to provide a color misregistration easing system capable of applying color misregistration correction only to part of a screen that needs color misregistration correction.

Another object of the present invention is to provide a color misregistration easing system capable of performing color misregistration correction either on a pixel basis or on a block basis.

Another object or the present invention is to provide a color misregistration easing system capable of identifying color misregistration whose degree exceeds a discernible level at which an observer can discern color misregistration, and preventing deterioration of image quality.

Another object of the present invention is to provide a color misregistration easing system capable of detecting a cause of color misregistration and controlling color misregistration correction according to the result of detection.

Another object of the present invention is to provide a color misregistration easing system capable of detecting that water supply is under way, performing color misregistration correction, and thus preventing deterioration of image quality.

A color misregistration easing system according to the present invention comprises a detecting means for using a color image signal sent from an imaging means for imaging a subject in field sequential mode to detect color misregistration or an event leading to color misregistration either pixel basis or a block basis, and a correcting means for correcting color misregistration of the color image signal either on a pixel basis or a block basis according to the detection result provided by the detecting means, and providing an output signal.

A color misregistration easing system according to the present invention comprises a calculating means for using a color image signal originating from an imaging means for imaging a subject in field sequential mode to calculate color misregistration or an event leading to color misregistration either on a pixel basis or a block basis, a correcting means for correcting color misregistration of the color image signal either on a pixel basis or on a block basis according to the calculation result provided by the calculating means and providing an output signal, a means for detecting a distribution of color misregistration of a screen using the calculation result provided by the calculating means and a switching means for selectively outputting an output of the correcting means or the color image signal according to the result of detection a means for detecting a distribution provides.

A color misregistration easing system according to the present invention comprises a detecting means for using a color image signal sent from an imaging means for imaging a subject in field sequential mode to detect color misregistration or an event leading to color misregistration either on a pixel basis or a block basis, a storing means for holding a color image signal associated with either a pixel or a given block that is determined not to have caused color misregistration according to the result of detection the detecting means provides, and a correcting means for correcting color misregistration on pixel basis or a block basis using a color image signal held in the storing means.

The other features and advantages of the present invention will be apparent in conjunction with the description below.

BRIEF DESCRIPTION OF THE DRAWINGS

FIGS. 2(a) and 2(b) are graphs showing the relationships between the quantities of changes on R-Y and B-Y axes of a color difference plane and the count of the number of pixels;

FIG. 3 is an explanatory diagram showing changes of color misregistration on a color difference plane;

FIGS. 23(a) and 23(b) are explanatory diagram showing color distributions and segments of a normal image and an image during water supply;

FIGS. 24(a) and 24(b) are explanatory diagram showing color distributions and segments of a color bar in still and animated modes;

DETAILED DESCRIPTION OF THE PREFERRED EMBODIMENTS

Figure 1:
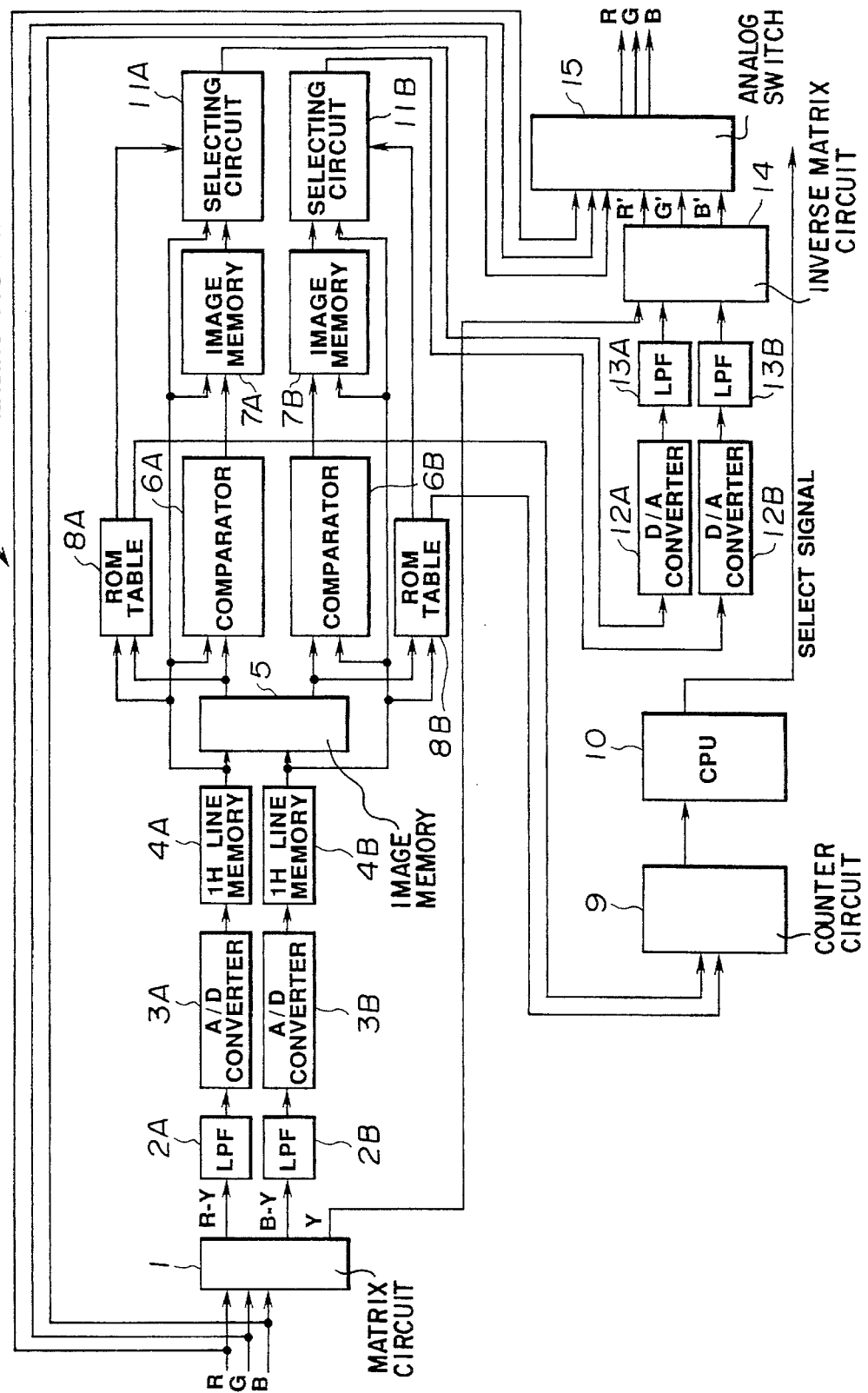
FIG. 1 is an overall block diagram of a color misregistration easing system of the first embodiment of the present invention.

FIGS. 1 to 3 relate to a first embodiment of the present invention. FIG. 1 is an overall block diagram of a color misregistration easing system of the first embodiment. FIG. 2 are graphs showing the relationships between the quantities of changes on R-Y and B-Y axes of a color difference plane of and the count of the numbers of pixels. FIG. 3 is an explanatory diagram showing a change of color misregistration on a color difference plane.

Figure 32:
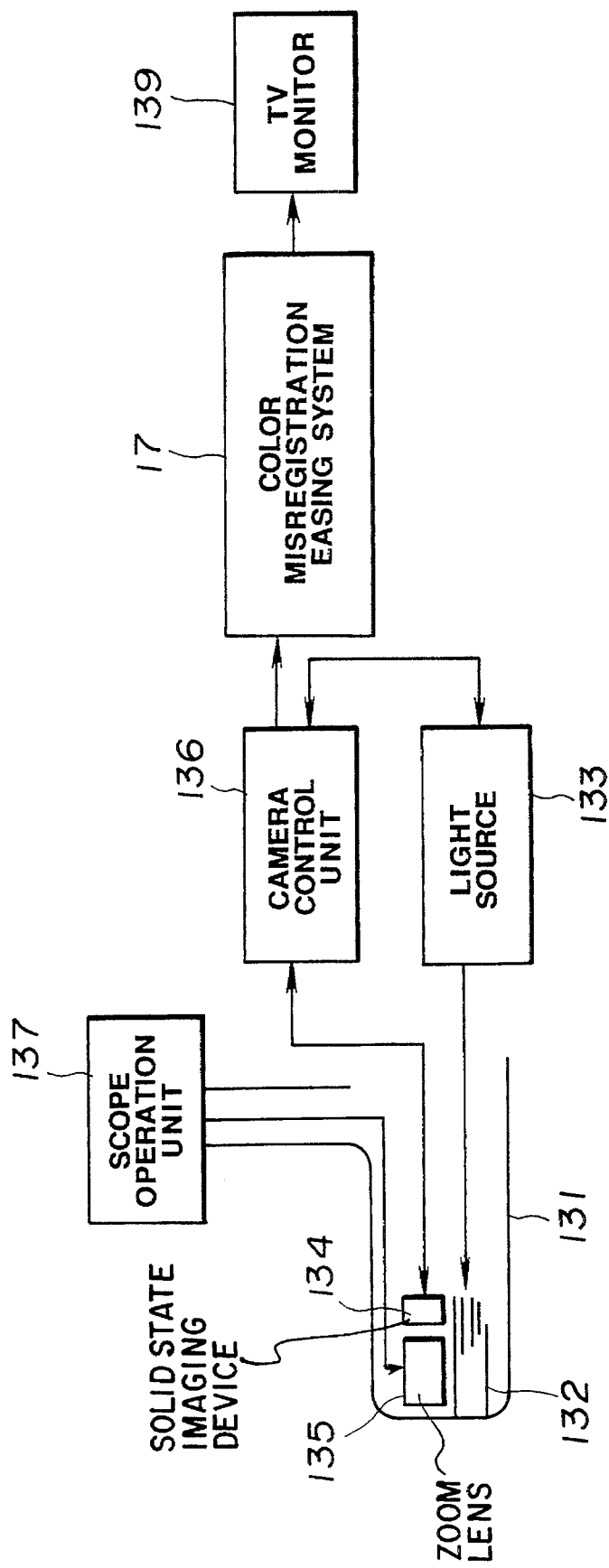
FIG. 32 shows an overall configuration of an electronic endoscope system.
Figure 33:
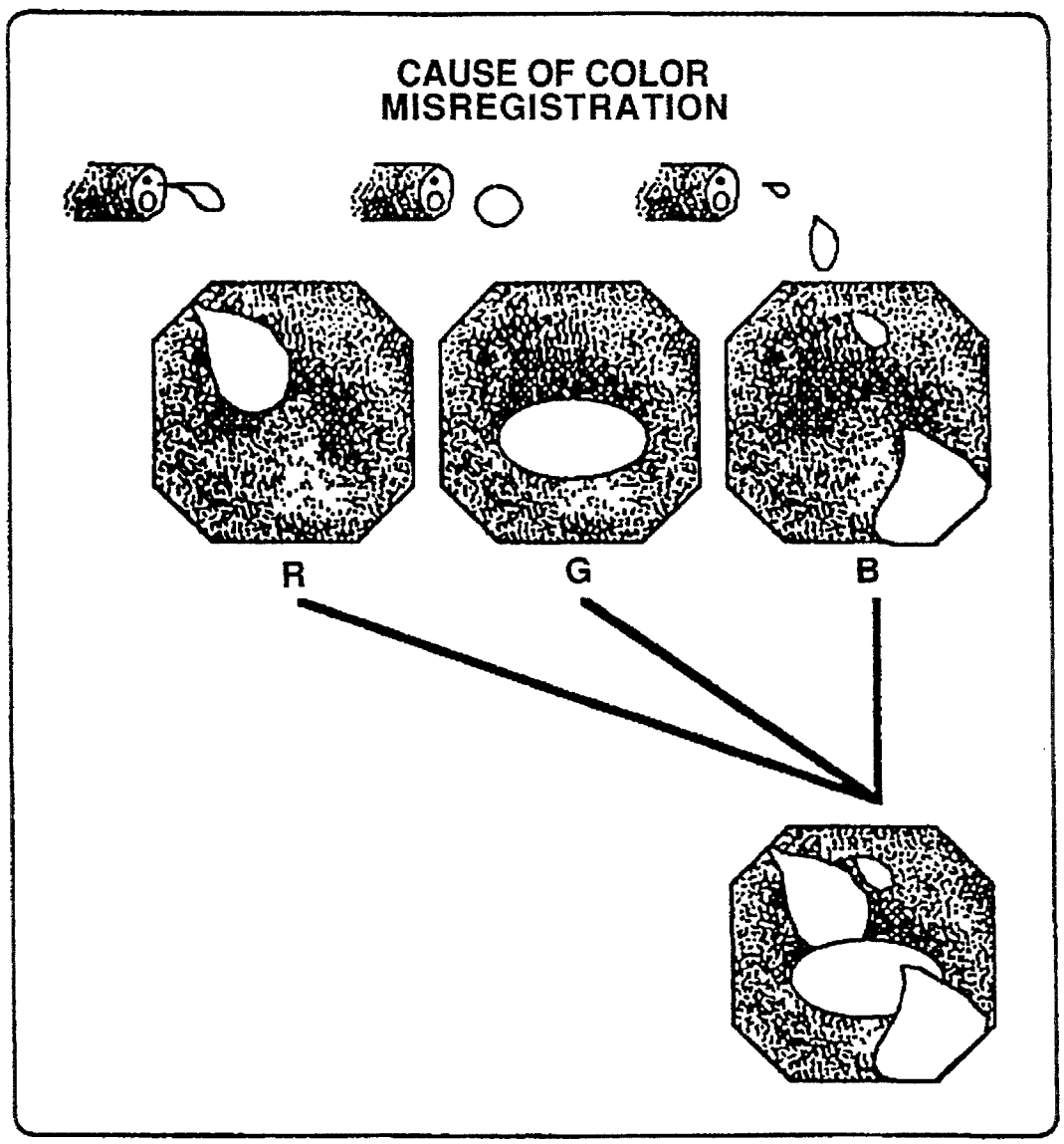
FIG. 33 is an explanatory diagram for explaining the principles of causing color misregistration.

First, an overall configuration of an electronic endoscope system will be described with reference to FIG. 32.

In an electronic endoscope 131 for observing a mucosal image of a living body in a body cavity, a light guide 132 routes illumination light from a light source 133 into the body cavity. Thus, the inside of the living body is illuminated. A camera control unit 136 controls the light source 133 to switch illumination light of red (R), green (G), and blue (B) rays in field cycles (in units of 1/60 sec). Under the control of the camera control unit 136, a solid state imaging device 134 receives reflected light from a subject in fields sequentially via a zoom lens 135, transforms the light photoelectrically, then outputs an image signal of the subject to the camera control unit 136. That is to say, tile imaging device 134 receives R, G, and B frame images in field cycles (1/60 second).

The zoom lens 135 enlarges an image acquired by the solid state imaging device 134. When an operation lever formed on a scope operation unit 137, which is not shown, is manipulated, the optical system of the zoom lens 135 moves to change angles of view.

The camera control unit 136 performs given signal processing on an image signal of a subject, then outputs R, G, and B image signals that are interlaced. To be more specific, R, G, and B frame image signals sent from the imaging device 134 are stored in R, G, and B frame memories that are not shown, read out in fields, interlaced, then supplied to a color misregistration easing system 17.

An image signal the camera control unit 136 handles is of the field sequential type. Therefore, when either a subject of a scope starts moving at an earlier time, color misregistration occurs. When the angle of view of the zoom lens 135 is changed abruptly by manipulating the scope operation unit 137, color misregistration occurs. The image signal handled by the camera control unit 136 is sent to the color misregistration easing system 17 for color misregistration correction. The image signal whose color misregistration is corrected by the color misregistration easing system 17 is supplied to a TV monitor 139, and thus a subject image is displayed.

In FIG. 1, a color misregistration easing system 17 is provided with R, G, and B image signals sent from a camera control unit 136. The color misregistration easing system 17 corrects three primary color signals R, G, and B for color misregistration, and selectively outputs either three primary color correction signals R', G', and B' or three primary color input signals R, G, and B. Since field-sequential imaging is adopted, input R, G, and B signals of an encoder 1 in the color misregistration easing system 17 are updated sequentially in cycles of 1/60 sec by component image signals placed in frame memories in fields.

As shown in FIG. 1, input R, G, and B signals making up a color image signal are supplied to a matrix circuit 1 and to an analog switch 15. The analog switch 15 inputs three primary color correction signals R', G', and B' sent from an inverse matrix circuit 14 to be described later. The analog switch 15 receives a select signal from a CPU 10. With the select signal, either a combined signal of three primary color signals R, G, and B or a combined signal of three primary color correction signals R', G', and B' is selected and supplied to a display that is not shown.

The matrix circuit 14 decomposes three input primary color signals R, G, and B into a luminance signal Y and color signals. In this embodiment, color difference signals R-Y and B-Y are generated as the color signals. The luminance signal Y and color difference signals R-Y and B-Y enter the inverse matrix circuit 14 and low-pass filters (hereafter, LPF) 2A and 2B. The LPFs 2A and 2B restricts the frequencies of the color difference signals R-Y and B-Y the matrix circuit 1 provides to a low band, then outputs the restricted color difference signals to A/D converters 3A and 3B. The A/D converters 3A and 3B convert the outputs of the LPFs 2A and 2B into digital color difference signals, and outputs the digital signals to 1H line memories 4A and 4B. In the line memories 4A and 4B, input data are delayed for a maximum of 1H (one horizontal) period. In the line memories 4A and 4B, the outputs of the A/D converters 3A and 3B are delayed for a time period of less than the 1H period that includes a signal delay time of several clocks arising in a correction signal processing system. Thereby, three primary color correction signals R', G', and B' entering the analog switch 15 lag behind the three primary color input signals R, G, and B by the 1H period. In other words, the three primary color correction signals R', G', and B' lag behind the three primary color input signals R, G, and B by one vertical line on a screen. However, no time lag arises horizontally. The vertical correlation of image data renders the vertical time lag resulting from color misregistration correction indiscernible.

Color difference data R-Y read from the 1H line memory 4A is supplied to an image memory 5, a image memory 7A for storing a last image or a pixel not causing color misregistration, a comparator 6A, a ROM table 8A, and a selecting circuit 11A. Color difference data B-Y read from the 1H line memory 4B is supplied to the image memory 5, an image memory for a last image 7B, a comparator 6B, a ROM table 8B, and a selection circuit 11B. The image memory 5 is a first-in-first-out (hereafter, FIFO) memory for detecting color misregistration, in which input color difference data R-Y and B-Y are delayed for a four-field period, and supplied to the comparators 6A and 6B, and the ROM tables 8A and 8B. As described above, the R, G, and B signals sent from an endoscope are updated, for example, in that order in field cycles. Therefore, it takes a three-field period for all R, G, and B component images to change. This means that color misregistration can be detected by comparing between image data of a four-field or longer period before and after. Scanning lines in an odd field lag behind those in an even field. However, in the image memory 5, data to be compared are located using a pixel position. This is the reason why color difference data is delayed for four fields.

The ROM table 8A contains a difference between color difference data R-Y of a four-field period before and after (quantity of a change on the R-Y axial of a color difference plane) at an address specified with the color difference data R-Y that is an input and output of the image memory 5. The ROM table 8B contains a difference between color difference data B-Y of a four-field period before and after (quantity of a change on the B-Y axis of a color difference plane) at an address specified with the color difference data. When an address is specified with an input and an output of the image memory 5, data of quantities of changes are retrieved from the specified address and supplied to the selecting circuits 11A and 11B, and to a counter circuit 9.

A comparator 6A compares between color difference data R-Y of a four-field period before and after. If the color difference data R-Y are consistent, a consistency detected signal is sent to an image memory 7A. Similarly, a comparator 6B compares between color difference data B-Y of a four-field period before and after that are an input and an output of an image memory 5. If the color difference data B-Y are consistent, a consistency detected signal is sent to an image memory 7B. That is to say, the comparators 6A and 6B determine for each pixel whether color difference components have changed from a four-field period before to the four-field period after. Each of the image memories 7A and 7B has addresses associated with pixels of a screen and contains color difference data R-Y and B-Y for one frame. When consistency detected signals come from the comparators 6A and 6B to indicate that no color misregistration has occurred, color difference data R-Y and B-Y read from 1H line memories 4A and 4B are held in the image memories 7A and 7B. More particularly, in the image memories 7A and 7B, data associated with pixels are updated by color difference data values R-Y and B-Y of a pixel in which no color misregistration has occurred, then a last image acquired before occurrence of color misregistration is stored on pixel basis. Unless color misregistration is developed forcibly and consecutively, new color difference data are written in the image memories 7A and 7B within one second after the previous update.

Data read from the image memories 7A and 7B are supplied to selecting circuits 11A and 11B. The selecting circuits 11A and 11B are provided with data of quantities of changes of color difference data read from ROM tables 8A and 8B. When the quantities of changes are smaller than given values, the selecting circuits 11A and 11B determine that no color misregistration has occurred in a given pixel, then output the color difference data R-Y and B-Y of the pixel read from line memories 4A and 4B. When the quantities of changes are larger than the given values, the selecting circuits 11A and 11B determine that color misregistration has occurred in the given pixel, then supply color difference data R-Y and B-Y of the pixel of the immediately preceding field, which are read from the image memories 7A and 7B, to D/A converters 12A and 12B, but do not supply the color difference data R-Y and B-Y of the pixel read from the line memories.

The D/A converters 12A and 12B convert input color difference data R-Y and B-Y into analog color difference signals (R-Y)' and (B-Y)', then supply the signals (R-Y)' and (B-Y)' to LPFs 13a and 13B. The LPFs 13A and 13B restrict frequencies of input color difference signals to a low band, then supply the restricted signals to an inverse matrix circuit 14. Thus, the inverse matrix circuit 14 receives corrected color difference signals representing part of a screen having intense color misregistration and uncorrected color difference signals representing part of the screen having little color misregistration. The inverse matrix circuit 14 performs inverse matrix processing on a luminance signal Y and color difference signals (R-Y)' and (B-Y)' to generate three primary color correction signals R', G', and B', then outputs the signals R', G', and B' to an analog switch 15.

On the other hand, data of quantities of changes retrieved from ROM tables 8A and 8B are also supplied to a counter 9 on pixel basis. The counter 9 counts pixels for each quantity of a change and calculates the number of pixels having the same quantity of a change. As described previously, the quantity of a change represents a difference between color difference data of a four-field period before and after. The counter 9 provides a distribution or a transition of a difference between each pair of color difference data of screens. The counter output of the counter 9 is put in a CPU 10.

Based on the output of the counter 9, the CPU 10 determines whether color misregistration of a given screen exceeds an observer's discernible level of color misregistration, then provides the analog switch 15 with a select signal for selecting either three primary color correction signals R', G', and B' or three primary color input signals R, G, and B as a correction output for correcting color misregistration. Transitions of differences between color difference data vary depending on an image. Therefore, the CPU 10 monitors a time-series change in the output of the counter 9 to detect an image causing outstanding color misregistration due to, for example, water supply or suction, then controls color misregistration correction. The analog switch 15 selects either the combined signal of three primary color correction signals R', G', and B' or the combined signal of three input primary color signals R, G, and B, then outputs the selected combined signal.

Next, the operations of the embodiment having the aforesaid configuration will be described.

An endoscope is inserted into a living body to observe, for example, the gastric wall. During observation, water is supplied and the region is dyed. R, G, and B signals from the endoscope are interlaced, and supplied to a matrix circuit 1 and to an analog switch 15. The matrix circuit 1 produces color difference signals R-Y and B-Y. These color difference signals are supplied to A/D converters 3A and 3B via LFPs 2A and 2B, then converted into digital signals. The digital color difference data R-Y and B-Y are placed in 1H line memories 4A and 4B, and delayed by a delay time arising in the color misregistration correction system. Then, the color difference data R-Y and B-Y are put in an image memory 5. In the image memory 5, the color difference data R-Y and B-Y are delayed by a four-field period. Then, the delayed color difference data is read out.

Each of comparators 6A and 6B compares between color difference data R-Y and B-Y of a four-field period before and after for each pixel. If the color difference data are consistent, each of the comparators 6A and 6B outputs a consistency detected signal. With inputs of consistency detection signals, the color difference data R-Y and B-Y read from 1H line memories 4A and 4B are written at addresses associated with the pixel position in image memories 7A and 7B. On the other hand, differences (quantities of changes) between color difference data R-Y and B-Y of a four-field period before and after are fetched from ROM tables 8A and 8B, then supplied to selecting circuits 11A and 11B. When data of quantities of changes read from the ROM table 8A and 8B indicate that the color difference data R-Y and B-Y read from the 1H line memories 4A and 4B have changed from those of the same pixel of four fields before by given values or more, the selection circuits 11A and 11B read color difference data R-Y and B-Y from the addresses associated with the pixel position in the image memories 7A and 7B, then supply the read data. In short, the selecting circuits 11A and 11B switch color difference data of a pixel causing color misregistration into color difference data of the pixel in a last image acquired before occurrence of the color misregistration, then supply the color difference data of the pixel in a last image. This switching is done on a pixel basis.

The outputs of the selecting circuits 11A and 11B are recomposed to analog signals by D/A converters 12A and 12B, restricted to a certain band by LPFs 13a and 13B, then supplied to an inverse matrix circuit 14. The inverse matrix circuit 14 receives a luminance signal Y from the matrix circuit 1 and color difference signals (R-Y)' and (BY)' from the LPFs 13A and 13B, produces three primary color correction signals R', G', and B', then outputs the R', G', and B' to an analog switch 15. In this embodiment, the luminance signal Y is not corrected. In other words, a luminance signal is acquired from a raw image but not from a still image produced before occurrence of color misregistration. This permits reliable reproduction of motion of an image.

On the other hand, quantities of changes of color difference data R-Y and B-Y of a four-field period before and after are also sent from the ROM tables 8A and 8B to a counter circuit 9 sequentially. Assuming that intense color misregistration occurs because of water supply or suction, the chromaticity of a given pixel changes remarkably from four fields before to four fields after or from a point A to a point B in FIG. 3. The quantities of changes of color difference data are large. In a normal image in which color misregistration is hardly discernible, the chromaticity changes slightly or from a point A to a point C in FIG. 3. The quantities of changes of color difference data are very small.

The counter circuit 9 counts pixels for each quantity of a change and provides the number of pixels having the same quantity of a change. When the number of pixels each having a large quantity of a change exceeds a given value for each screen, a CPU 10 determines that water supply is in progress. Then, the CPU 10 outputs a select signal for selecting an output of an inverse matrix circuit 14 to an analog switch 15. Thus, only when intense color misregistration occurs due to water supply, the CPU 10 permits color misregistration correction. When color misregistration is indiscernible, a raw signal is supplied.

For color misregistration correction to be performed at a level more consistent with an observers' discernible level, the CPU 10 may monitor a time-series change in a counter output and determine whether or not to permit color misregistration correction. FIG. 2 provide graphs for explaining the references the CPU 10 uses to make determinations. That is to say, the CPU 10 monitors on a time-series basis a counter output representing the number of pixels having a relatively small quantity of a change (CNT1) and a counter output representing the number of pixels having a relatively large quantity of a change (CNT2). Normally, when a mucosal image is animated, changes in color difference signals are relatively small. When gastric juice is sucked, an imaging unit of an endoscope is sunk in water to suck gastric juice. Even in this case, changes in color difference signals are relatively small. Therefore, using only a count at the CNT1 level, an animated mucosal image having conspicuous color misregistration cannot be differentiated from an image produced during suction. However, suction continues for one to two seconds. That is to say, counting continues over several tens of frames. Consequently, the count at the CNT1 level comes to a large value. For this reason, when a count at the CNT1 level exceeds a given value for a relatively short period, the CPU 10 identifies an animated mucosal image and outputs a select signal for selecting input signals R, G, and B. When the count at the CNT1 level exceeds the given value for several tens of times continuously, the CPU 10 becomes aware that suction is under way, and outputs a select signal for selecting three primary correction color signals R', G', and B'.

On the other hand, during water supply or suction in which a scope is not immerse in water, changes in a color difference signals are large. Therefore, in this case, a count at the CNT2 level becomes a large value. For instance, when a halation area of a mucosal image moves, the count at the CNT2 level becomes large. To correct the halation area, the CPU 10 instructs that when a count exceeds a given value, three primary color correction signals R', G', and B' should be selected without taking account of a time-series change in a count at the CNT2 level. On the other hand, when the image does not require color misregistration correction, the CPU 10 does not carry out correction until the count at the CNT2 level exceeds the given value for a given period.

Thus, in this embodiment, a counter circuit 9 counts the number of pixels for each quantity of a change of color difference data. A CPU 10 monitors the counts and recognizes a distribution of color misregistration in a screen. Thereby, the CPU 10 identifies a cause of the color misregistration. Only for color misregistration derived from water supply or color misregistration discernible to an observer is color misregistration correction carried out. This prevents deterioration of image quality due to unnecessary correction. In addition, since time-series changes in quantities of changes of color difference data are detected, conspicuous color misregistration can be differentiated from inconspicuous color misregistration more precisely. This permits high-precision image display. Comparators 6A and 6B put color difference data of a last image acquired before occurrence of color misregistration into image memories 7A and 7B on pixel basis. When color misregistration occurs, selecting circuits 1A and 11B read data from the image memories 7A and 7B, and supply the data. Therefore, color misregistration correction can be done on a pixel basis. This results in improved image quality of an image that has undergone color misregistration correction.

When the comparators and selecting circuits handle data on a block basis, color misregistration correction can be done, needless to say, on a block basis.

During water supply, color misregistration occurs over an entire screen. Comparison between image signals of a four-field period before and after does not permit detection of color misregistration. When intense color misregistration occurs because of water supply, writing in the image memories 7A and 7B that record only still images may be stopped.

In this embodiment, color difference signals R-Y and B-Y are used for detecting a cause of color misregistration and correcting color misregistration. Color signals in another color space may be employed to detect, for example, changes on an I axis and a Q axis. Color signals in a color space of a U or V chromaticity or xy chromaticity coordinate system or an L*a*b*, HSI, or RGB color space may be employed.

Figure 4:
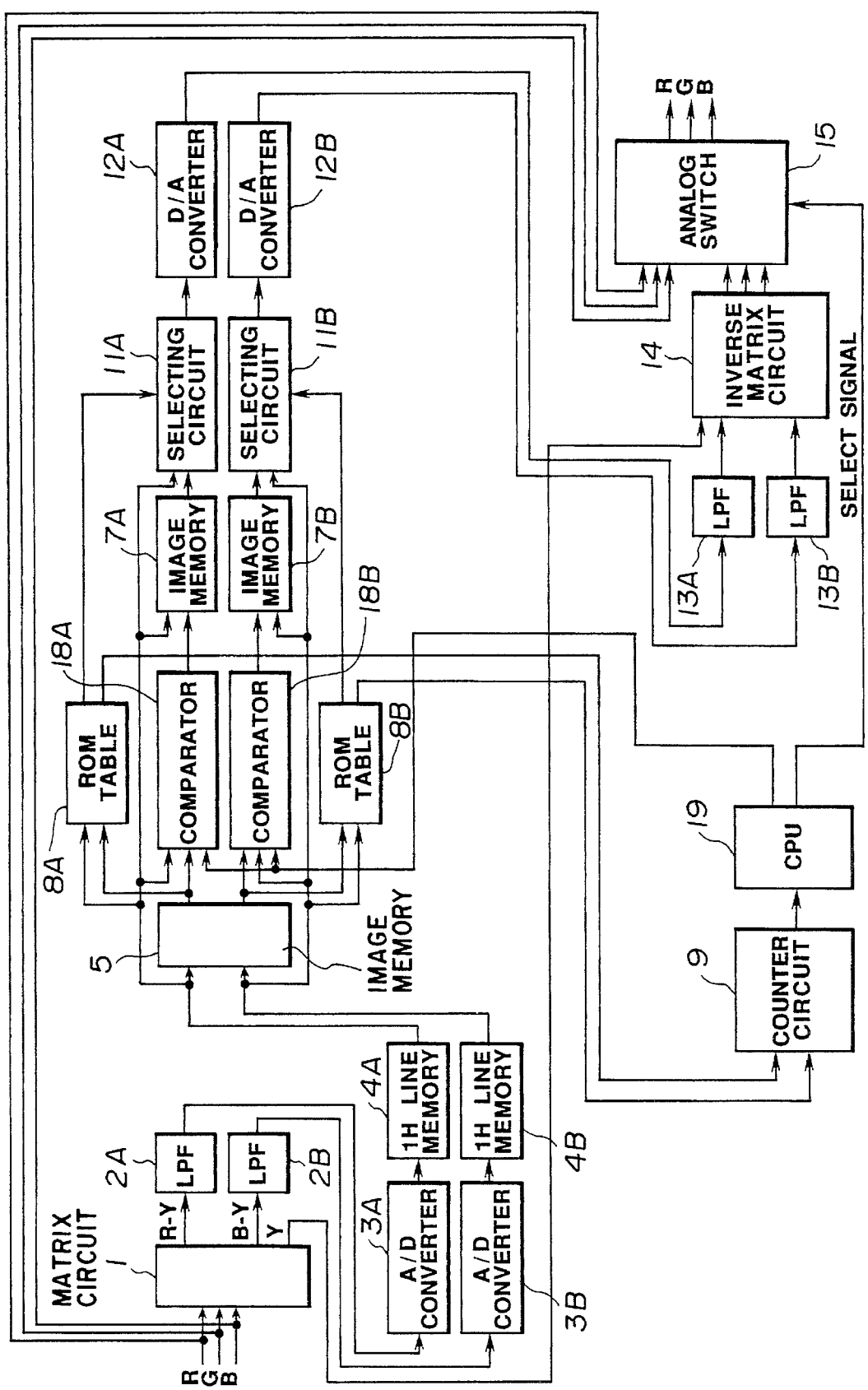
FIG. 4 is an overall block diagram of a color misregistration easing system of the second embodiment of the present invention.
Figure 5:
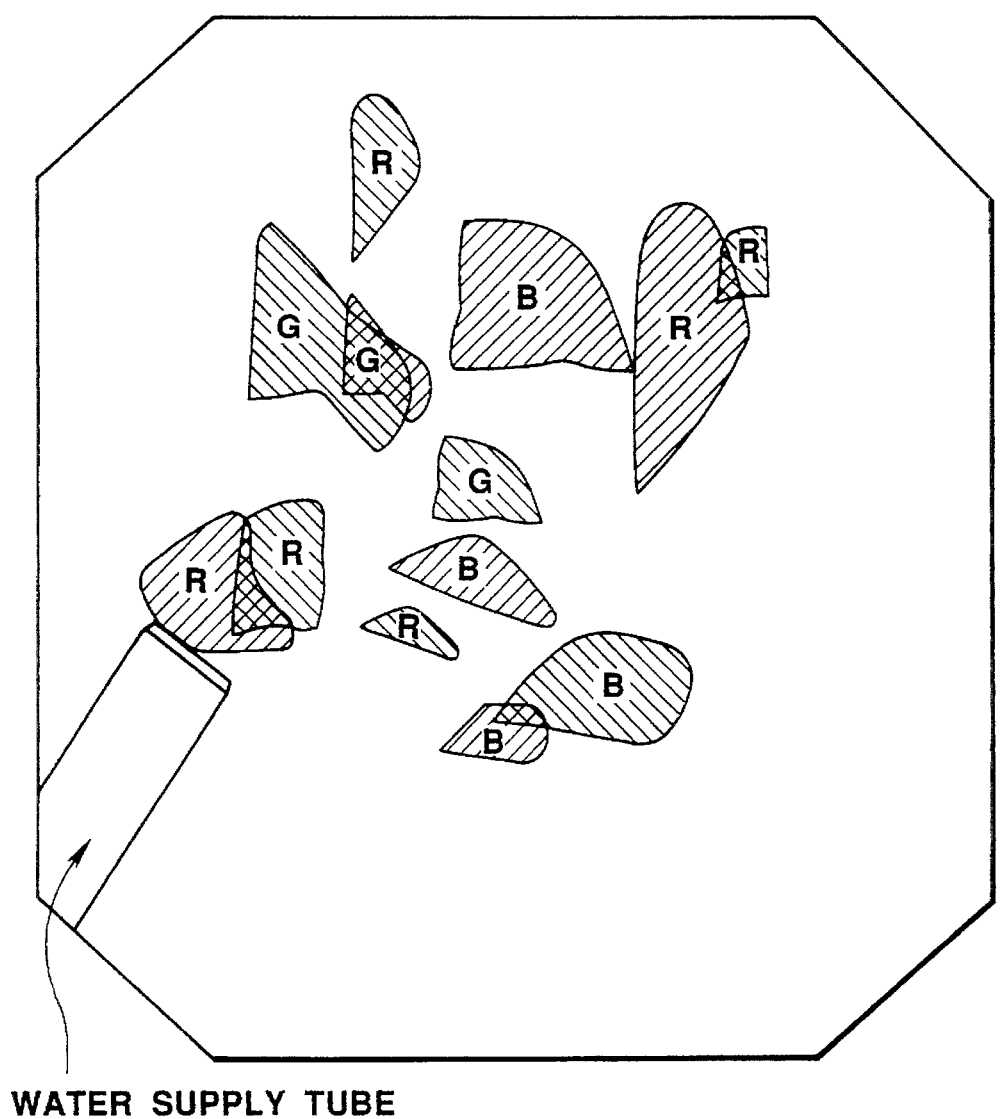
FIG. 5 is an explanatory diagram showing an occurrence of color misregistration.

FIGS. 4 and 5 show a second embodiment of the present invention. FIG. 4 is an overall block diagram of a color misregistration easing system according to the second embodiment. FIG. 5 is an explanatory diagram showing an occurrence of color misregistration. In FIG. 4, components identical to those in FIG. 1 are assigned the same numerals. The description will be omitted.

In this embodiment, comparators 18A and 18B are substituted for comparators 6A and 6B. A CPU 10 is replaced by a CPU 19. This is a difference from the embodiment shown in FIG. 1. Color difference data R-Y and B-Y of a four-field period before and after, which are inputs and outputs of an image memory 5, are supplied to the comparators 18A and 18B. The comparators 18A and 18B checks if the color difference data have changed between the four-field period before and after. If the color difference data are consistent, consistency detected signals are sent to image memories 7A and 78. On the other hand, the CPU 19 checks counter outputs of a counter circuit 9 or a time-sequential change in the counter output, and determines whether color misregistration of a given screen exceeds an observers' discernible level of color misregistration. Then, the CPU 19 outputs a select signal to an analog switch 15. For example, the CPU 19 checks a time-sequential change in a count to determine whether a current image shows intense color misregistration due to water supply or suction, or a slowly-moving normal mucosa.

Color misregistration occurs all over a screen during water supply. Even when color misregistration is identified by comparing between image signals of four fields before and after immediately after onset of water supply, the color of a pixel that should be determined to cause color misregistration may accidentally agree with the color of a pixel having caused color misregistration four fields before. FIG. 5 shows this state. Left-hatched areas represent areas regarded as color misregistration four fields before, and right-hatched areas represent areas that should be regarded as color misregistration four fields after. In FIG. 5, hatched areas have any of colors R, G, and B for convenience sake. In an area in which left-hatched and right-hatched areas of the same color overlap (meshed area in FIG. 5), assuming that a change in saturation is small, color difference data R-Y and B-Y of a four-field period before and after are substantially consistent. That is to say, when only the comparators 18A and 18B are used to detect consistency, the image is recorded as an image not causing color misregistration in the image memories 7A and 7B, though intense color misregistration has occurred.

Then, in this embodiment, a CPU 19 checks a time-series change in a counter output of a counter circuit 9 or a counter value (for example, a count at the CNT2 level in FIG. 2) representing the number of pixels having a large quantity of a change of color difference data, and determines whether intense color misregistration has occurred in many pixels. When the CPU 19 determines that intense color misregistration has occurred in many pixels, the CPU 19 outputs inconsistency signals to comparators 18A and 18B. In response to the inconsistency signals from the CPU 19, the comparators 18A and 18B stop outputting consistency detected signals.

In this embodiment having the aforesaid configuration, when the CPU 19 determines that intense color misregistration has occurred in many pixels, inconsistency signals are sent to the comparators 18A and 18B. The comparators 18A and 18B consider that color misregistration has occurred despite input color difference data of a four-field period before and after, and, therefore, do not supply consistency detected signals to image memories 7A and 7B. Thereby, color difference data R-Y and B-Y read from 1H line memories 4A and 4B are not written in the image memories 7A and 7B. Therefore, even when intense color misregistration occurs because of water supply, color difference data associated with the areas causing the color misregistration will not be written in the image memories 7A and 7B.

Color misregistration is not identified by detecting differences between color difference data of a given field period before and after but may be identified by calculating ratios of color difference data of a given field period before and after. In addition, comparators 18A and 18B determine whether image data R-Y and B-Y of a color difference signal lagging a four-field period and a current color difference signal are consistent or inconsistent. At this time, not only consistent image data but also inconsistent image data whose differences are negligible may be recorded in image memories 7A and 7B.

Figure 6:
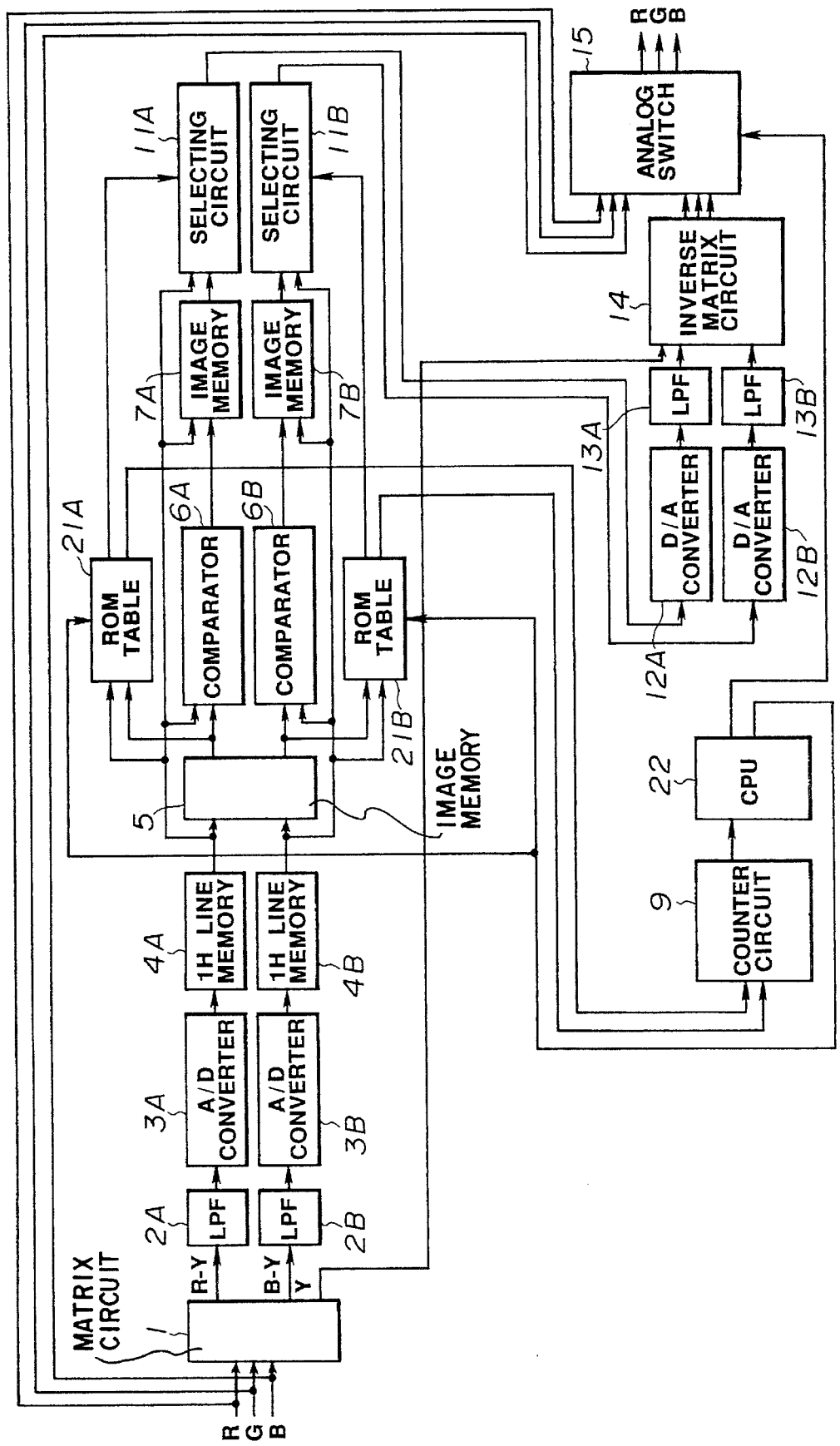
FIG. 6 is an overall block diagram showing a color misregistration easing system according to a third embodiment of the present invention.

FIG. 6 is an overall block diagram of a color easing system according to the third embodiment of the present invention. In FIG. 6, components identical to those in FIG. 1 are assigned the same numerals. The description will be omitted.

In this embodiment, ROM tables 21A and 21B are substituted for ROM tables 8A and 8B. A CPU 10 is replaced by a CPU 22. This is a difference from the embodiment of FIG. 1.

The ROM table 21A comprises multiple tables. In each of the tables, data based on a difference between color difference data R-Y (quantity of a change on the R-Y axis of a color difference plane) of a four-field period before and after is contained at an address specified with the color difference data R-Y of the four-field period before and after that are an input and an output of an image memory 5. The ROM table 21B contains multiple tables. In each of the tables, data based on a difference between color difference data B-Y (quantity of a change on the B-Y axis of a color difference plane) of the four-field period before and after is contained at an address specified with the color difference data B-Y of the four-field period before and after. Under the control of the CPU 22, any tables of the ROM tables 21A and 21B are selected with addresses specified with inputs and outputs of the image memory 5. Then, data contained at the addresses are supplied to selecting circuits 11A and 11B and a counter circuit 9. That is to say, based on the tables of the ROM tables 21A and 21B the CPU 22 selects, color misregistration detection can be done at a different detection level.

The CPU 22 checks counter outputs of the counter circuit 9 or a time-series change in the output to determine a cause of color misregistration. When the cause of the color misregistration is found to be water supply or suction, the CPU 22 outputs a select signal for selecting three primary color correction signals R', G', and B' to an analog switch 15. As described previously, the CPU 22 selects tables of the ROM tables 21A and 21B according to a cause of color misregistration.

In this embodiment having the aforesaid configuration, when the CPU 22 checks outputs of a counter circuit 9 and determines that color misregistration in an input image is hardly discernible, the CPU 22 instructs an analog switch 15 to select three primary color input signals R, G, and B. When water supply is under way, the CPU 22 determines that intense color misregistration is discernible after checking outputs of the counter circuit 9. Then, the CPU 22 instructs the analog switch 15 to select three primary color correction signals R', G', and B', and switches tables of the ROM tables 21A and 21B. Thereby, the ROM tables 21A and 21B specify a lower color misregistration detection level. Thereby, even when color misregistration is relatively minor, selecting circuits 11A and 11B fetch data from the image memories 7A and 7, then supply the data. That is to say, during water supply, a larger range of image data acquired is subjected to color misregistration correction using a last image acquired before occurrence of color misregistration.

As described previously, in this embodiment, tables of ROM tables 21A and 21B are selected according to a cause of color misregistration, and thus color detection levels are changed. This permits more reliable correction.

Alternatively, tables of ROM tables may be held constant, and selection standards of selecting circuits 11A and 11B may be varied according to the cause of color misregistration.

Figure 7:
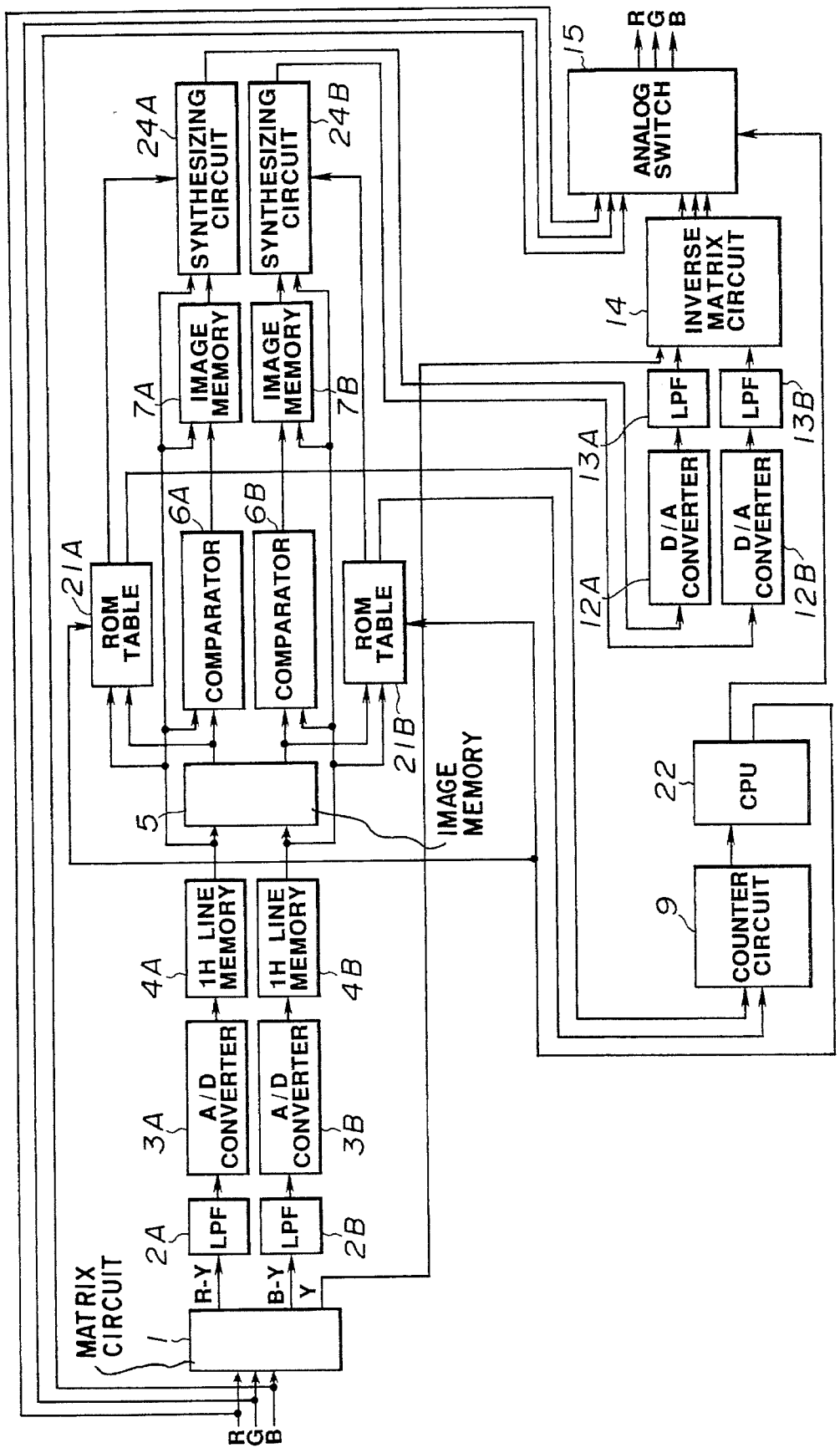
FIG. 7 is an overall block diagram showing a color misregistration easing system of a fourth embodiment.
Figure 8:
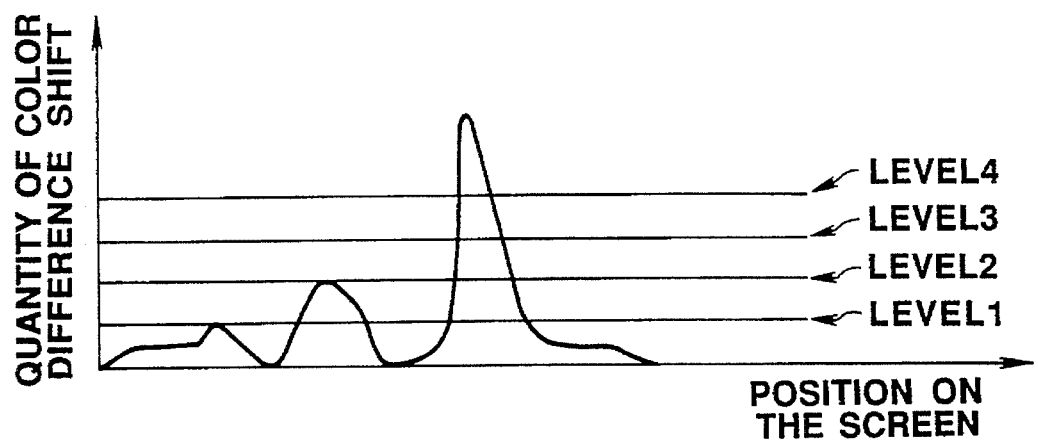
FIG. 8 is an explanatory diagram showing the relationships among the position on a screen, the quantity of a color difference shift, and the color misregistration level.
Figure 9:
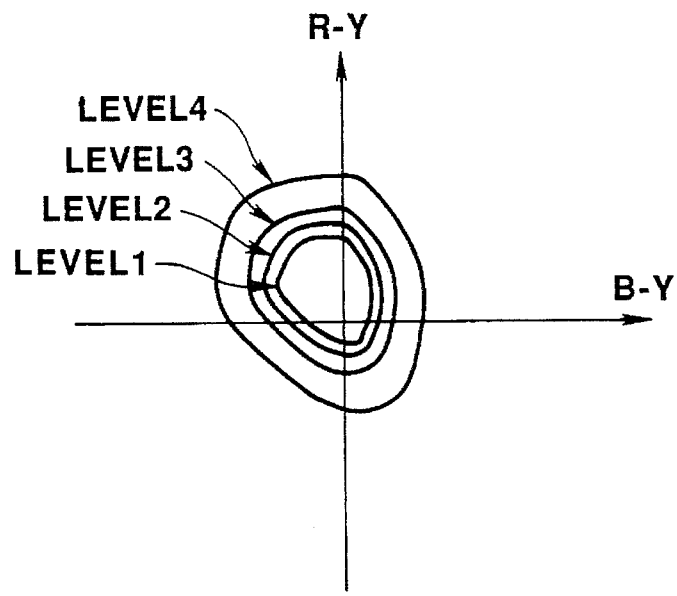
FIG. 9 is an explanatory diagram showing the relationships between the position on a color difference plane and the color misregistration level.

FIGS. 7 to 9 relate to the fourth embodiment of the present invention. FIG. 7 is an overall block diagram of a color misregistration easing system according to the fourth embodiment. FIG. 8 is an explanatory diagram showing the relationships among the position on a screen, the quantity of a color difference shift, and the color misregistration level. FIG. 9 is an explanatory diagram showing the relationships between the position on a color difference plane and the color misregistration level. In FIG. 7, components identical to those in FIG. 6 are assigned the same numerals. The description will be omitted.

In this embodiment, synthesizing circuits 24A and 24B are employed instead of selecting circuits 11A and 11B in the third embodiment. The synthesizing circuits 24A and 24B receive data of quantities of changes (quantities of color difference-axis shift) of color difference data of a four-field period before and after that are read on pixel basis from ROM tables 21A and 21B. The synthesizing circuits 24A and 24B synthesize color difference data read from 1H line memories 4A and 4B with color difference data read from image memories 7A and 7B, then output the synthetic data. In addition, the synthesizing circuits 24A and 24B vary the synthetic ratios according to the data of quantities of color difference shifts read from the ROM tables 21A and 21B or a degree of color misregistration. For instance, the synthesizing circuits 24A and 24B classify quantities of color difference shifts into four levels, and establish synthetic ratios in association with the levels.

Next, the operations of the embodiment having the aforesaid configuration will be described with reference to FIGS. 8 and 9.

Normally, in an animated mucosal image or in an image of a bleeding region or other slowly moving subject, brightness hardly changes. Occurring color misregistration is characterized by a little color difference variation. On the other hand, color misregistration derived from water supply, suction, or other movement is characterized by great Level variations among R, G, and B signals and large quantities of color difference shifts. In general, a single screen contains pixels showing large quantities of color difference shifts and pixels showing small quantities of color difference shifts. FIG. 8 shows this state. Quantities of color difference shifts are classified into four levels.

In FIG. 8, a level 1 represents a limit of a quantity of a color difference shift for color misregistration that has occurred actually but can hardly be discernible on a screen. That is to say, when a quantity of a color difference shift rating below the level 1 is detected in the ROM tables 21A and 21B respectively, the image is determined to show, for example, a slowly moving subject. A quantity of a color difference shift of a level 4 or above indicates occurrence of discernible intense color misregistration resulting from, for example, water supply. Various levels of color misregistration are existent on a single screen. Each of the synthesizing circuits 24A and 24B specifies a synthetic ratio in association with a level representing a quantity of a color difference shift.

When a quantity of color misregistration is limited or when quantities of color difference shifts are small, in the third embodiment, selecting circuits 11A and 11B supply color difference data recorded in image memories 7A and 7B before occurrence of color misregistration instead of outputs of 1H line memories 4A and 4B. In this case, an image based on three primary color correction signals R', G', and B' may give a feeling of unnaturalness. On the contrary, when the outputs of the ROM tables 21A and 21B indicate occurrence of color misregistration having a small quantity of color misregistration or, for example, a quantity of color misregistration rating below the level 1 in FIG. 8, the synthesizing circuits 24A and 24B of this embodiment decrease the ratios of color difference data read from the image memories 7A and 7B and increase the ratios of color difference data read from the 1H line memories 4A and 4B. then synthesize the color difference data read from the image memories and 1H line memories. Thereby, when a quantity of color misregistration is small, a corrected image will not give an unnatural feeling.

On the other hand, when conspicuous color misregistration occurs and quantities of color difference shifts are large, the synthesizing circuits 24A and 24B decrease the ratios of color difference data read from the 1H line memories 4A and 4B, increase the ratios of color difference data read from the image memories 7A and 7B, then synthesize the color difference data read from the 1H line memories and image memories. In short, a larger quantity of correction data is used to minimize color misregistration.

Endoscopic images have, in general, a red tone. Reddish color misregistration is inconspicuous. On the contrary, color misregistration of cyan or green that is a complementary color of red in an endoscopic image is very conspicuous. Then, as shown in FIG. 9, levels may vary with hues. In FIG. 9, red color misregistration is set to a high level. Thereby, the synthetic ratios of data read from the image memories 7A and 7B become smaller than those for color misregistration of any other tone. This permits optimal color misregistration correction according to the type of an image.

As described previously, in this embodiment, color difference data is synthesized with color difference data of a last image acquired before occurrence of color misregistration, then the synthetic data is supplied. The synthetic ratio of a last image acquired before occurrence of color misregistration is varied depending on the degree of color misregistration. Color misregistration of an animated image can be eased in real time without giving a feeling of unnaturalness.

Figure 10:
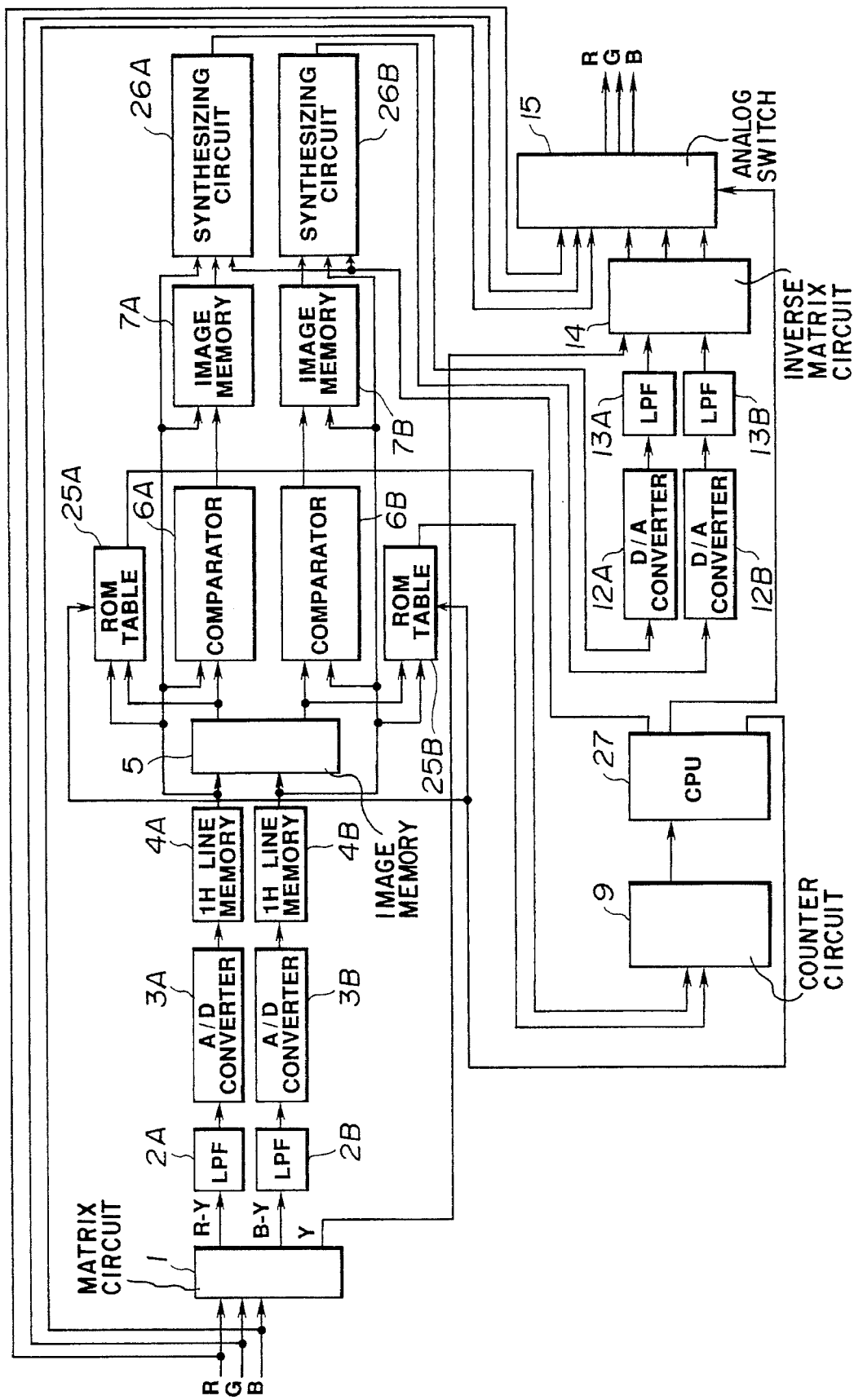
FIG. 10 is an overall block diagram showing a color misregistration easing system of a fifth embodiment.
Figure 11:
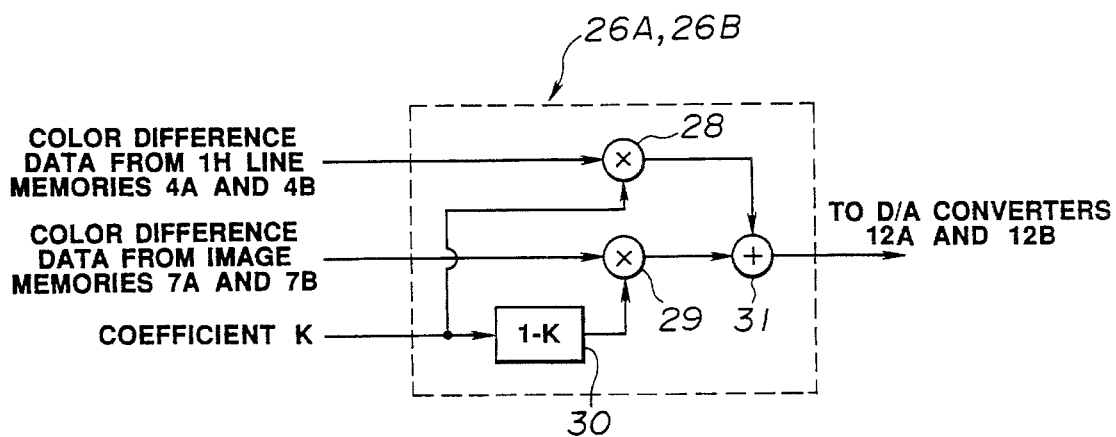
FIG. 11 is a block diagram showing synthesizing circuits 26A and 26B in FIG. 10.
Figure 12:
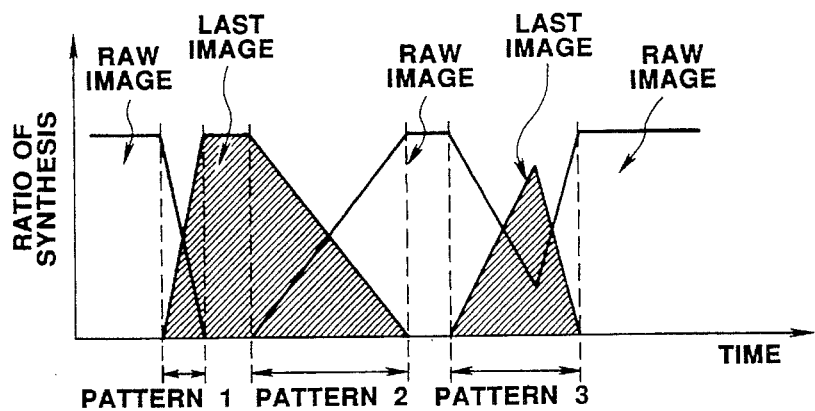
FIG. 12 is an explanatory diagram showing a time-sequential change in the synthetic ratio of a raw image and a correction image.

FIGS. 10 to 12 relate to the fifth embodiment of the present invention. FIG. 10 is an overall block diagram of a color misregistration easing system according to the fifth embodiment. FIG. 11 is a block diagram showing synthesizing circuits 26A and 26B in FIG. 10. FIG. 12 is an explanatory diagram showing a time-sequential change in the synthetic ratio of a raw image to a correction image. In FIG. 10, components identical to those in FIG. 7 are assigned the same numerals. The description will be omitted.

This embodiment employs ROM tables 25A and 24B instead of ROM tables 21A and 21B of the fourth embodiment. Synthesizing circuits 24A and 24B are replaced by synthesizing circuits 26A and 26B. A CPU 27 is used on behalf of a CPU 22. The ROM tables 25A and 25B do not pass control to the synthesizing circuits 26A and 26B. On this point, the ROM tables 25A and 25B differ from the ROM tables 21A and 21B. The synthesizing circuits 26A and 26B synthesize outputs of 1H line memories 4A and 4B with outputs of image memories 7A and 7B. In this embodiment, the synthetic ratios for the synthesizing circuits 26A and 26B vary on a time-series basis with a coefficient K sent from the CPU 27.

The synthesizing circuits 26A and 26B have the same configuration, including, as shown in FIG. 11, multipliers 28 and 29, an arithmetic logic unit 30, and an adder 31. The multiplier 28 inputs color difference data read from the 1H line memories 4A and 4B, and the multiplier 29 inputs color difference data read from the image memories 7A and 7B. The coefficient K is data in the range of $0 \leq K \leq 1$, which is supplied to the multiplier 28 and to the arithmetic logic unit 30. The arithmetic logic unit 30 calculates a coefficient $(1-K)$ using the coefficient K, then outputs the coefficient $(1-K)$ to the multiplier 29. The multipliers 28 and 29 multiply input color difference data by K and $(1-K)$ respectively, then supply the outputs to the adder 31. The adder synthesizes the outputs of the multipliers 28 and 29 and supplies the synthesized data to D/A converters 12A and 12B. The synthesizing circuits 26A and 26B may be formed with digital signal processors (DSP) or ROM tables.

The coefficient K is determined by the CPU 27. Based on an output of a counter circuit 9, the CPU 27 calculates a time-sequential change in color misregistration, a quantity of a change on a color difference plane, and an area of color misregistration, then identifies the cause of the color misregistration. The CPU 27 generates a select signal for controlling an analog switch 15 according to the identified cause of the color misregistration, and selects tables of the ROM tables 25A and 25B. In this embodiment, the CPU 27 generates a coefficient K in association with a cause of color misregistration, and thus changes the synthetic ratios for the synthesizing circuits 26A and 26B on a time-series basis. That is to say, the CPU 27 changes the value of the coefficient K in consideration of various occurrence patterns of color misregistration.

Next, the operations of the embodiment having the aforesaid configuration will be described in conjunction with FIG. 12.

Synthesizing circuits 26A and 26B synthesize color difference data of a last image recorded in image memories 7A and 7B before occurrence of color misregistration with color difference data read from 1H line memories 4A and 4B. A CPU 27 controls the synthetic ratios for synthesizing circuits 26A and 26B according to an output of a counter circuit 9.

FIG. 12 explains control of synthetic ratios by a CPU 27. In FIG. 12, dashed lines indicate ranges in which a last image is fully employed (color difference data read from an image memory 7A or 7B).

When no color misregistration occurs or when a normal mucosal image is produced, the CPU 27 sets, for example, 1 as a coefficient K and outputs the value to synthesizing circuits 26A and 26B. Then, outputs of arithmetic logic units 30 become 0. Multipliers 28 in the synthesizing circuits 26A and 26B pass outputs of 1H line memories 4A and 4B to adders 31 without any change. Multipliers 29 do not provide the adders 31 with data of image memories 7A and 7B. Thereby, raw image data are sent from the synthesizing circuits 26A and 26B as they are. Assume that water is supplied torrentially at this time. The CPU 27 learns it from a counter output that quantities of color difference shifts or the number of pixels causing color misregistration is large, and determines that torrential water supply has started. Then, the CPU 27 decreases the coefficient K from 1 to a very small value. The coefficients of the multipliers 28 lessen sharply. The coefficients of the multipliers 29 increase sharply. Thus, as shown with a patten 1 in FIG. 12, the synthetic ratio of a last image increases greatly. Then, when water supply terminates gradually, the CPU 27 varies the coefficient K relatively moderately, and reduces the synthetic ratio of the last image gradually, as shown with a pattern 2 in FIG. 12.

When a normal mucosa is observed, conspicuous color misregistration hardly occurs. When frames are changed abruptly due to movement of an imaging device, the synthetic ratio of a last image is varied as shown with a pattern 3. In this case, correction image data sent from the synthesizing circuits 26A and 26B may not be constituted with only the last image data.

As described above, in this embodiment, synthetic ratios are varied on a time-series basis according to a cause and occurrence situation of color misregistration or in association with a time-sequential change in a quantity of a change in color misregistration. Even when an animated image is observed, color misregistration can be corrected to provide a natural image.

Figure 13:
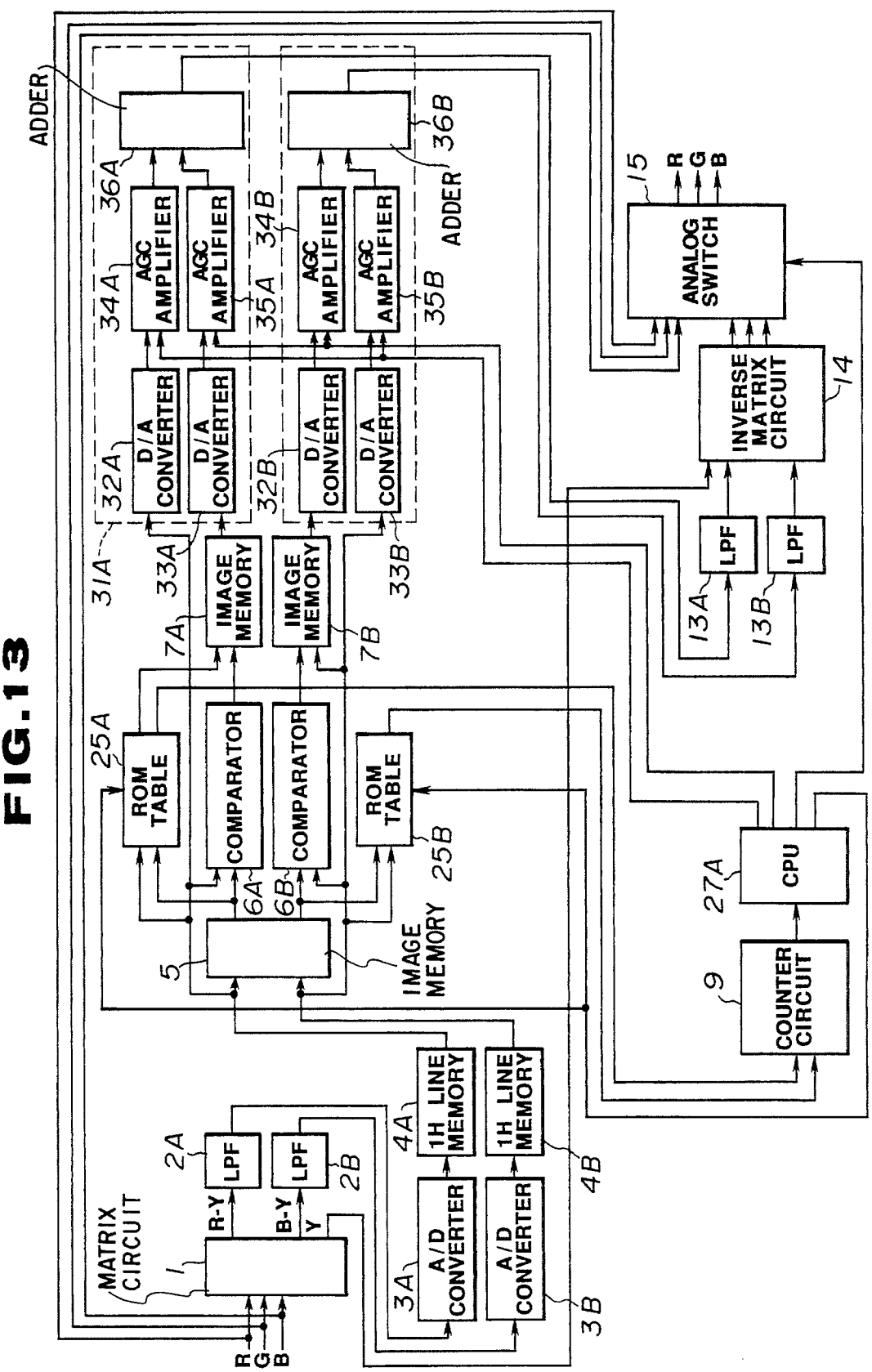
FIG. 13 is an overall block diagram showing a color misregistration easing system of a sixth embodiment according to the present invention.

FIG. 13 is an overall block diagram of a color misregistration easing system according to the sixth embodiment of the present invention. In FIG. 13, components identical to those in FIG. 10 are assigned the same numerals. The description will be omitted.

A color misregistration easing system of this embodiment has synthesizing circuits 31A and 31B for analog processing instead of synthesizing circuit 26A and 26B for digital processing, and employs a CPU 27A on behalf of a CPU 27. D/A converters 12A and 12B have been abandoned, which is a difference from the fifth embodiment. D/A converters 32A and 33A of the synthesizing circuit 31A receive color difference data read from a 1H line memory 4A and an image memory 7A respectively, convert the input color difference data into analog signals, then supply the analog signals to AGC amplifiers 34A and 35A. The AGC amplifiers 34A and 35A amplify the input color difference signals at gains based on a control signal from the CPU 27, then supply the amplified signals to an adder 36A. D/A converters 32B and 33B of the synthesizing circuit 31B receive color difference data read from a 1H line memory 4B and an image memory 7B respectively, convert the input color difference data into analog signals, then supply the analog signals to AGC amplifiers 34B and 35B. The AGC amplifiers 34B and 35B amplify the input color difference signals at gains based on a control signal from the CPU 27A, then supply the amplified signals to an adder 36B. The adders 36A and 36B add inputs and supply outputs to LPFs 13A and 13B. Control by the CPU 27A is identical to that by the CPU 27. Instead of a coefficient K, a control signal whose level varies depending on a cause and occurrence situation of color misregistration is supplied to AGC amplifiers 34A, 34B, 35A, and 35B.

In the embodiment having the aforesaid configuration, color difference data read from 1H line memories 4A and 4B are converted into analog signals by D/A converters 32A and 32B. Color difference data read from image memories 7A and 7B containing last image data acquired before occurrence of color misregistration are converted into analog color difference signals. The gains of the analog signals sent from the D/A converters 32A, 32B, 33A, and 33B are controlled by AGC amplifiers 34A, 34B, 35A, and 35B. The gains set for the AGC amplifiers 34A, 34B, 35A, and 35B vary with a control signal from the CPU 27A. For example, when water supply is started abruptly in a state in which no color misregistration occurs, the CPU 27A learns abrupt start of water supply from a counter output, increases the gains set for the AGC amplifiers 35A and 35B sharply, and decreases the gains set for the AGC amplifiers 34A and 34B sharply. The outputs of the AGC amplifiers 34A and 34B are added by the adder 36A. The outputs of the AGC amplifiers 35A and 35B are added by the adder 36B. Thereby, correction images associated with the degree of color misregistration are produced.

As described previously, synthesizing circuits are formed with analog circuits. This results in a small-sized and low-cost circuitry.

Figure 14:
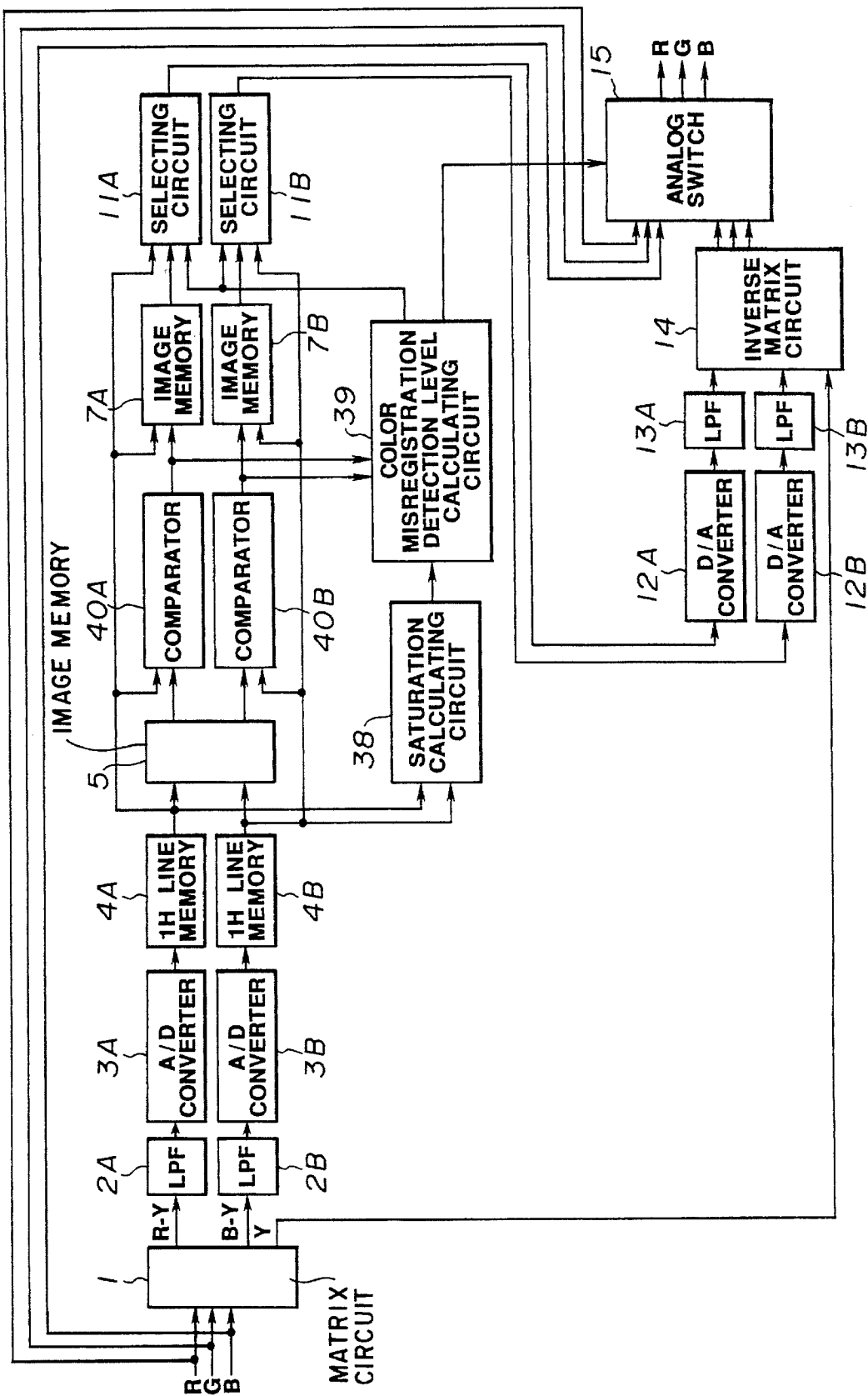
FIG. 14 is an overall block diagram showing a color misregistration easing system of a seventh embodiment according to the present invention.

FIG. 14 is an overall block diagram of a color easing system according to the seventh embodiment of the present invention. In FIG. 14, components identical to those in FIG. 1 are assigned the same numerals. The description will be omitted.

In the first embodiment, quantities of shifts of color differences of a pixel between a four-field period before and after are detected to differentiate conspicuous color misregistration from inconspicuous color misregistration. Thus, color misregistration correction is controlled properly. In this embodiment, a level of detecting color misregistration is varied depending on a subject or an occurrence situation of color misregistration, and thus only conspicuous colors are corrected.

A color misregistration easing system shown in FIG. 14 has a saturation calculating circuit 38 and a color misregistration detection level calculating circuit 39 that substitutes for ROM tables 8A and 8B, a counter circuit 9, and a CPU 10 the color misregistration easing system 17 of the first embodiment has. Comparators 6A and 6B are replaced by comparators 40A and 40B. The saturation calculating circuit 38 inputs color difference data R-Y and B-Y read from 1H line memories 4A and 4B. The saturation calculating circuit 38 detects a hue and a saturation on pixel basis, and outputs a saturation relative to a given hue to the color misregistration detection level calculating circuit 39.

The comparators 40A and 40B compare between color difference data R-Y and B-Y of a four-field period before and after or inputs and outputs of an image memory 5. If the data R-Y and B-Y are consistent, consistency detected signals are put in image memories 7A and 7B. The comparators 40A and 40B calculate quantities of color difference shifts (quantities of changes) between the four-field period before and after, and output the calculated quantities to the color misregistration detection level calculation circuit 39.

When the quantities of color difference shifts sent from the comparators 40A and 40B exceed a predetermined color misregistration detection level, the color misregistration detection level calculating circuit 39 outputs a detected signal to selecting circuits 11A and 11B. In response to the detected signals, the selecting circuits 11A and 11B retrieve color difference data from the image memories 7A and 7B respectively, and supply the retrieved color difference data instead of the outputs of the 1H line memories 4A and 4B. The color misregistration detection level calculating circuit 39 determines a cause of color misregistration according to an output of the saturation calculating circuit 39. In addition, the color misregistration detection level calculating circuit 39 controls selection of an analog switch 15 according to the cause of color misregistration, and changes color misregistration detection levels.

In this embodiment having the aforesaid configuration, a saturation calculating circuit 38 detects a hue and a saturation on pixel basis. The saturation calculating circuit 38 outputs a saturation relative to a specific hue to a color misregistration detection level calculating circuit 39. The color misregistration detection level calculating circuit 39 determines a cause of color misregistration according to an input saturation. For example, the color misregistration detection level calculating circuit 39 detects a saturation of a pixel whose hue is green. Normal endoscopic images are reddish. When a normal image is animated, high-saturation green is not misregistered. During water supply or suction, high-saturation green is misregistered. Therefore, the color misregistration detection level calculation circuit 39 detects a distribution of pixels each having a hue of green and a saturation exceeding a given value, and thus determines whether color misregistration is derived from water supply or suction. The color misregistration detection level calculating circuit 39 sets a color misregistration detection level according to the detected cause of color misregistration. The detection level calculating circuit 39 compares quantities of color difference shifts sent from comparators 40A and 40B with the set color misregistration detection level, and thus detects color misregistration on pixel basis, then outputs the detected signal to selecting circuits 11A and 11B.

Based on the color misregistration detected signals sent from the color misregistration detection level calculation circuit 39, the selecting circuits 11A and 11B select either color difference data read from 1H line memories 4A and 4B or color difference data of a last image acquired before occurrence of color misregistration read from image memories 7A and 7B. Thereby, color misregistration is corrected on pixel basis.

Thus, in this embodiment, a color misregistration detection level is varied depending on a subject or a occurrence situation of color misregistration. Only conspicuous color misregistration is corrected effectively. Only a saturation relative to a specific hue need be detected. This results in a smaller circuitry.

Figure 15:
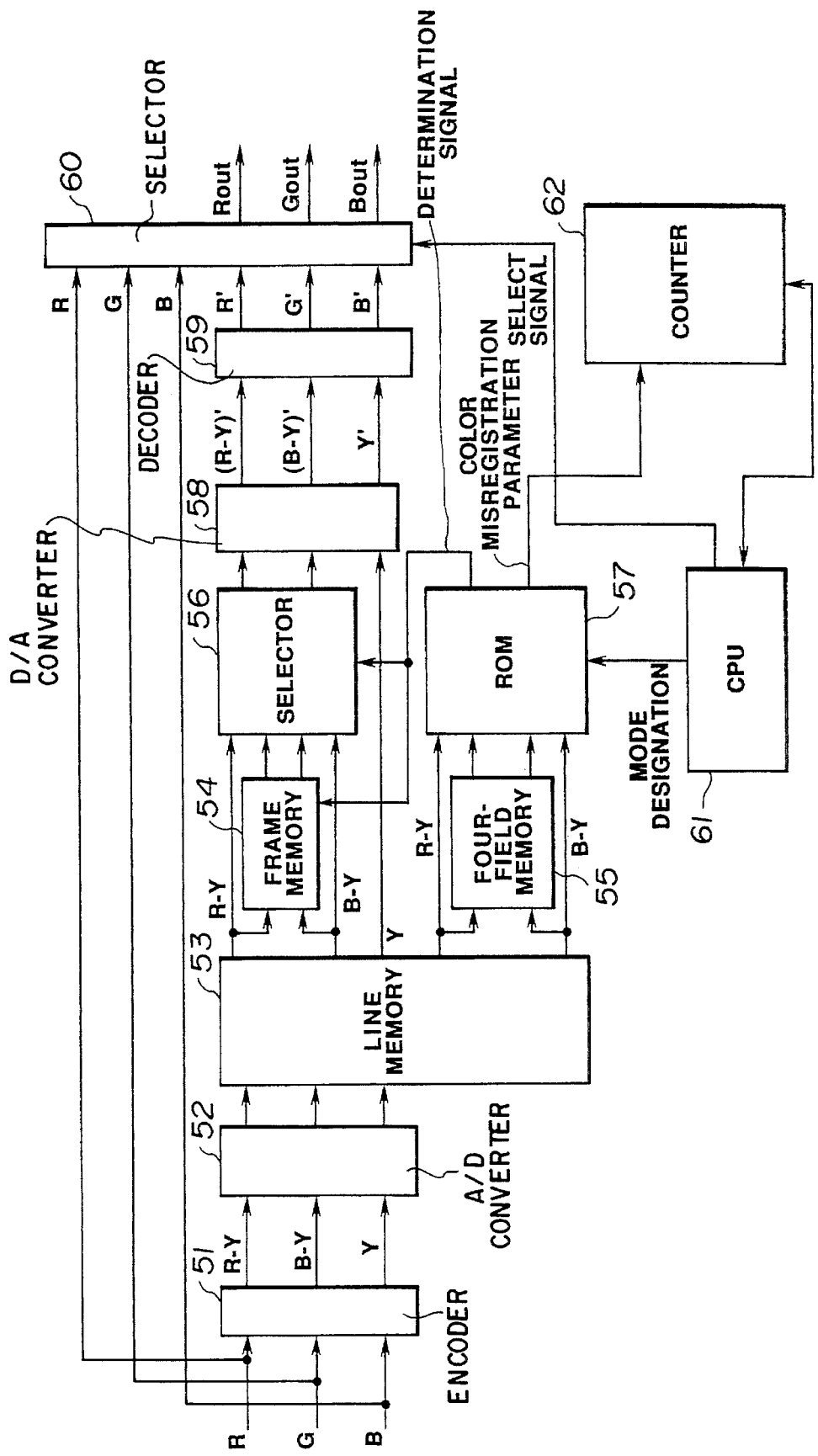
FIG. 15 is an overall block diagram showing a color misregistration easing system of a eighth embodiment.
Figure 16:
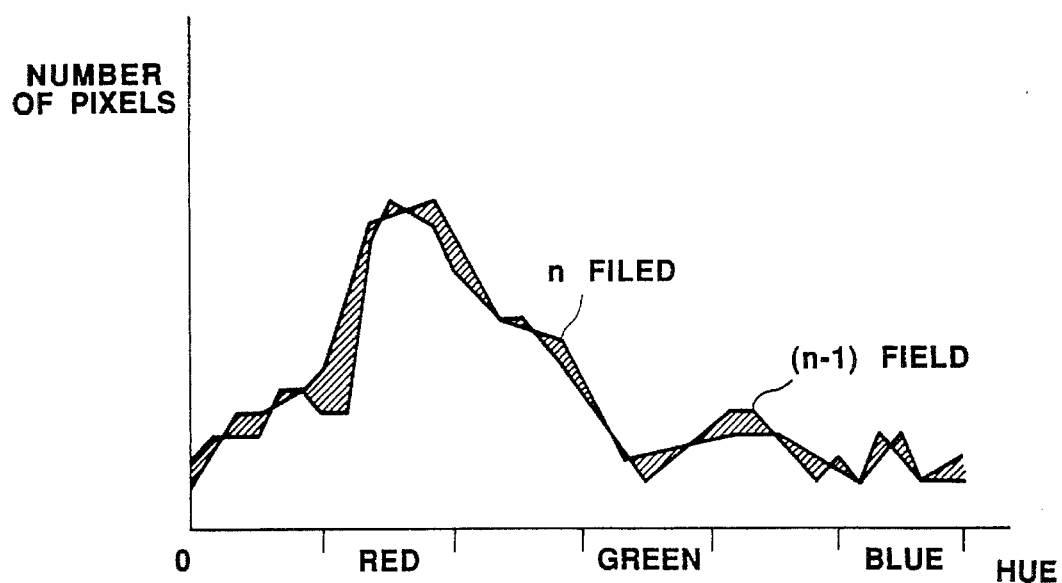
FIGS. 16 to 18 are histograms for explaining the concept of mode detection.
Figure 17:
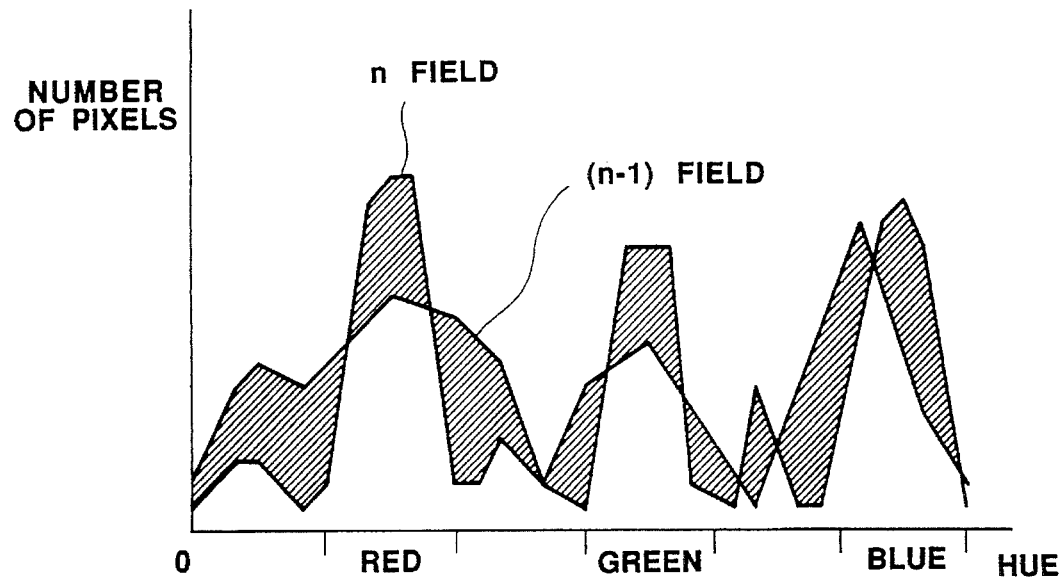
Figure 18:
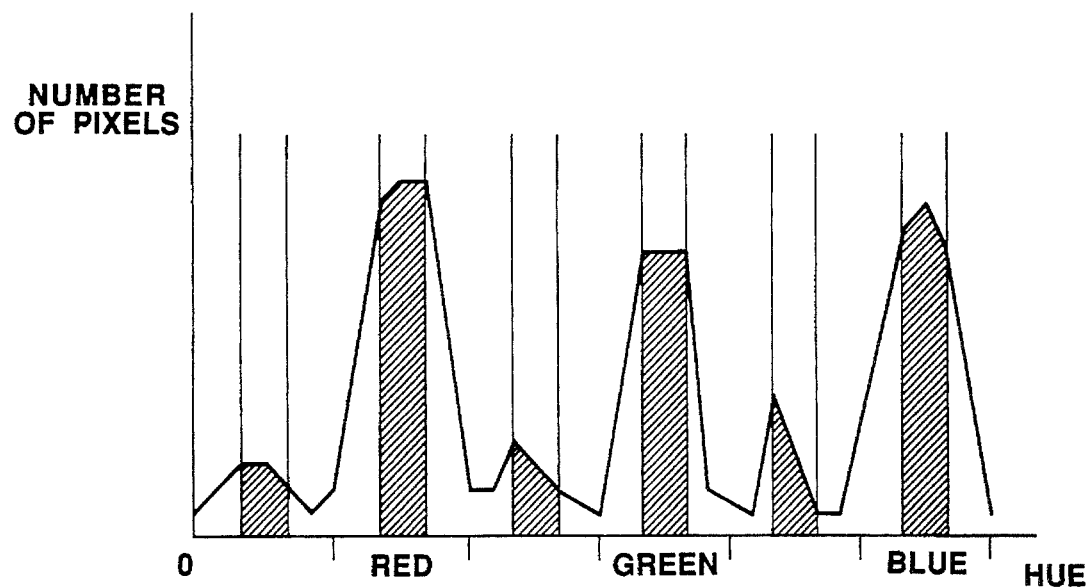
Figure 19:
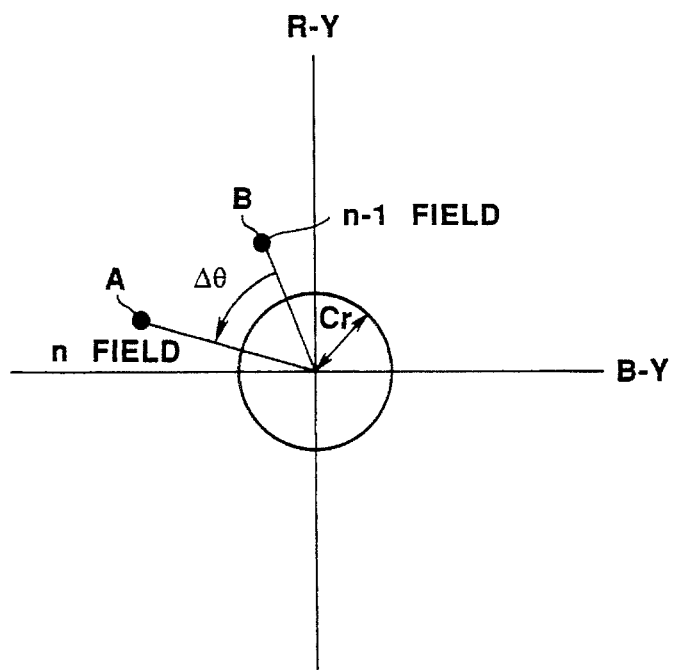
FIGS. 19 and 20 are graphs for explaining the concept of color-misregistered pixel detection.
Figure 20:
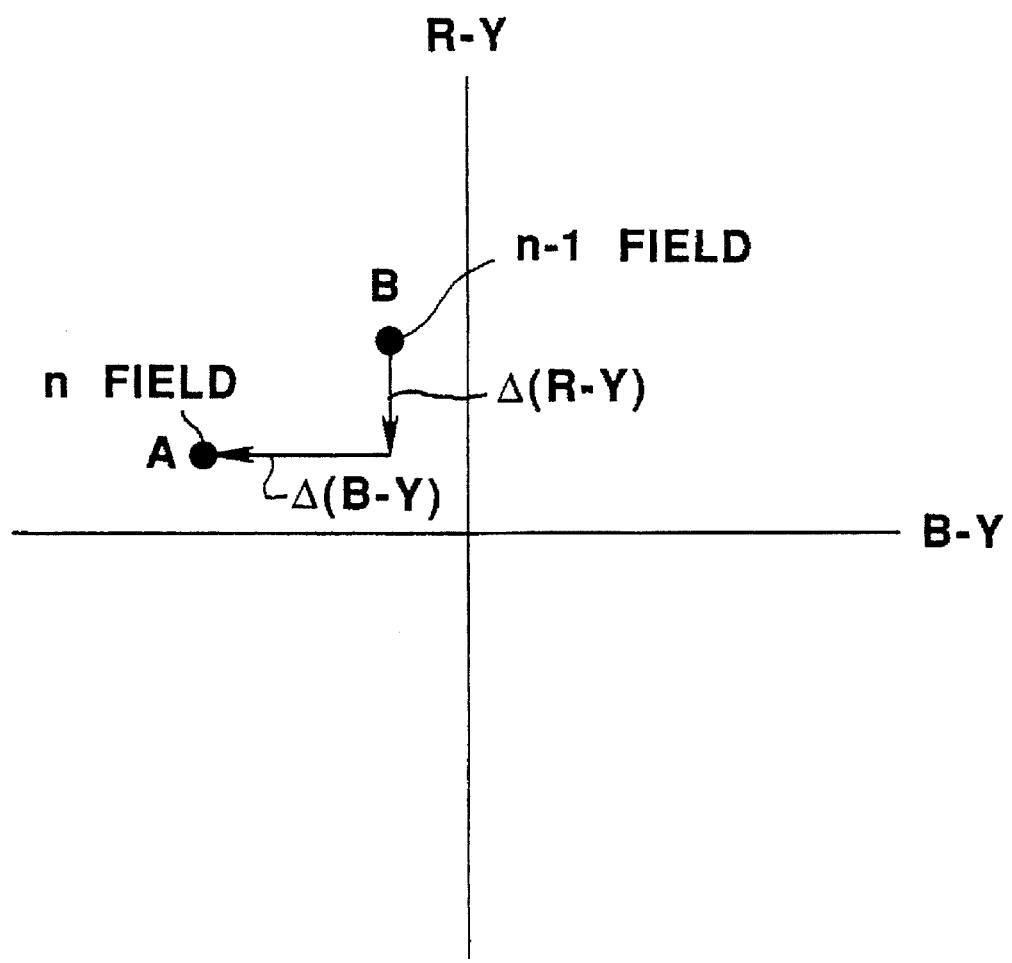

FIGS. 15 to 20 relate to the eighth embodiment of the present invention. FIG. 15 is an overall block diagram of a color misregistration easing system according to the eighth embodiment. FIGS. 16 to 18 are histograms for explaining the concept of mode detection. FIGS. 19 and 20 are graphs for explaining the concept of color-misregistered pixel detection. The color misregistration easing system of the embodiment corrects three primary color signals R, G, and B for color misregistration, selectively outputs either three primary color correction signals R', G', and B' resulting from the color misregistration correction or three input primary color signals R, G, and B according to a state of color misregistration.

A color misregistration easing system shown in FIG. 15 inputs R, G, and B input signals similar to those in the first embodiment. These R, G, and B input signals are supplied to an encoder 51 and to a selector 60. The selector 60 also receives three primary color correction signals R', G', and B' from a decoder 50 to be described later. The selector 60 receives a select signal from a CPU 61. Based on the select signal, either a combined signal of three primary color signals R, G, and B or a combined signal or three primary color correction signals R', G', and B' is selected and sent to a display that is not shown. The selector 60 is formed with, for example, a semiconducting video switch.

The encoder 51 decomposes three primary color input signals R, G, and B into a luminance signal and color signals. In this embodiment, color difference signals are produced as the color signals. A luminance signal Y and color difference signals R-Y and B-Y the encoder 51 produces are supplied to an A/D converter 52. The A/D converter 52 converts the luminance signal Y and color difference signals R-Y and B-Y into the digital luminance data Y and digital color difference data R-Y and B-Y, then outputs the digital data to a line memory 53. In the line memory 53, the three kinds of input data are delayed for a maximum of 1H (one horizontal) period. In the line memory 53, the outputs of the A/D converter 52 are delayed for a time period covering a signal delay time for several clocks that arises in a correction signal processing system starting with the encoder 51 and ending with the selector 60 but does not exceed the 1H period. Thereby, the three primary color correction signals R', G', and B' entering the selector 60 lag the 1H period behind the three primary color signals R, G, and B. In other words, the three primary color correction signals R', G', and B' lag behind the three primary color input signals R, G, and B by one vertical line of a screen. However, no time lag occurs horizontally. Owing to vertical correlation of image data, a time lag derived from color misregistration correction is indiscernible.

Color difference data R-Y and B-Y read from the line memory 53 are put in a four-field memory 55, a last image frame memory 54, a ROM 57, and a selector 56. The luminance data Y is supplied to a D/A converter 58. The four-field memory 55 is a first-in-first-out (FIFO) memory for detecting occurrence of color misregistration, in which input color difference data R-Y and B-Y are delayed for a four-field period, and supplied to the ROM 57.

Hue data associated with the color difference data R-Y and B-Y is saved at an address specified with the color difference data R-Y and B-Y in the ROM 57. The color difference data R-Y and B-Y read from the line memory 53 point to an address of the ROM. Thereby, hue data contained at the address is fetched as a color misregistration parameter into a counter 9. In the ROM 57, hue data is retrieved from an address pointed to by the color difference data R-Y and B-Y read from the four-field memory 55. Then, depending on whether a difference between hue data of four fields before and after exceeds a given decision reference value, it is determined on pixel basis whether color misregistration has occurred. Then, a determination signal is sent to the frame memory 54 and to the selector 56. The ROM 57 includes a table based on differences between color differences as well as a table based on differences between hues. A difference between color difference data R-Y of a four-field period before and after is saved at an address specified with the color difference data R-Y in the ROM 57. A difference between color difference data B-Y of the four-field period before and after is saved at an address specified with the color difference data B-Y in the ROM 57. Thereby, in the ROM 57, a determination signal may be produced according to the differences between the color difference data R-Y and B-Y of the four-field period before and after.

The frame memory 54 stores color difference data R-Y and B-Y for one frame, and holds the color difference data R-Y and B-Y read from the line memory 53 when a determination signal from the ROM 57 indicates that no color misregistration has occurred. That is to say, in the frame memory 54, data associated with pixels are updated by color difference data R-Y and B-Y of a pixel not causing color misregistration, and a last image acquired before occurrence of color misregistration is stored on pixel basis. Data read from the frame memory 54 is supplied to the selector 56. When the determination signal indicates that no color misregistration has occurred in a given pixel, the selector 56 fetches the color difference data R-Y and B-Y of the pixel from the line memory 53. When the determination signal indicates that color misregistration has occurred in the given pixel, color difference data R-Y and B-Y of the pixel of, for example, one field before, which are read from the frame memory 54, are supplied instead of the color difference data R-Y and B-Y of the pixel read from the line memory 53.

The D/A converter 58 converts the input luminance data Y and color difference data R-Y and B-Y into an analog luminance signal Y' and analog color difference signals (R-Y)' and (B-Y)', then outputs the analog signals to a decoder 59. The decoder 59 performs inverse matrix processing on the luminance signal Y' and color difference signals (R-Y)' and (B-Y)' to produce three primary color correction signals R', G', and B', then outputs the correction signals to the selector 60.

On the other hand, a color misregistration parameter read from the ROM 57 is supplied to a counter 62. The counter 62 is reset at every leading field by a CPU 61, which performs counting for each color misregistration parameter and thus calculates the number of pixels having the same color misregistration parameter. As described previously, the color misregistration parameter shows a hue specified with outputs of the line memory 53. The counter 62 provides a frequency (distribution) of each hue for each screen. The counter output of the counter 62 is supplied to the CPU 61.

The CPU 61 checks the output of the counter 62 to see if color misregistration of a given screen exceeds an observers' discernible level of color misregistration, then provides the selector 60 with a select signal for selecting either the three primary color correction signals R', G', or B' or outputs resulting from color misregistration correction, or the three primary color input signals R, G, and B. For instance, the CPU 61 selects multiple counter outputs indicating a specific hue frequency from among all counter outputs, and reads them out. If the read counter value exceeds a predetermined value, the CPU 61 sets a color misregistration correction mode and outputs a select signal for selecting three primary color correction signals R', G', and B'. Based on the select signal, the selector 60 selectively outputs either a combined signal of three primary color correction signals R', G', and B' or a combined signal of three primary color input signals R, G, and B.

After setting the color misregistration correction mode, the CPU 61 outputs a mode designation signal representing the color misregistration correction mode to the ROM 57. Even when a difference between hues (or color differences) of a four-field period before and after is relatively small, a determination signal indicating occurrence of color misregistration is supplied. That is to say, in the color misregistration correction mode, a low value is specified as a decision reference value for color-misregistered pixel detection in the ROM 57.

Next, the operations of this embodiment having the aforesaid configuration will be described.

An endoscope that is not shown is inserted into a living body to observe, for example, the gastric wall. Then, water supply or dying is done during the observation. R, G, and B signals originating from the endoscope are interlaced, then supplied to an encoder 51. Here, the observed image is checked for three attributes of luminance, hue, and saturation. When the gastric wall of a living body is observed without water supply, substantially all pixels have a hue of red, though their luminances and saturations differ partly. Therefore, a distribution of hues over a screen becomes very stable throughout fields. Color difference components at the same pixel position become very stable throughout fields, too. When methylene blue or other cyanic pigment is used for dying, pixels take hues close to red or cyan. In this case, a distribution of hues over a screen and color difference components at the same pixel position become almost stable throughout fields.

On the other hand, when an endoscope that is not shown is used to supply water, waterdrops jetted by the water supply intersect the front of an objective that is not shown. Depending on the timing of applying color transmission filters, the shape of a waterdrop, the angle of falling light with respect to a waterdrop, a distribution of hues of a screen and color difference components at the same pixel position greatly vary from field to field. This results in the increased numbers of pixels having hues of three primary color signals R, G, and B and of pixels having the intermediate hues.

To overcome this drawback, in this embodiment, when a water supply mode is designated, a smaller value is adopted as a decision reference value for detecting color-misregistered pixels during water supply, while a larger value is adopted as the decision reference value for detecting color-misregistered pixels during normal endoscopy.

The concept of water supply mode detection will be described in conjunction with FIGS. 16 to 18.

The histogram shown in FIG. 16 plots a hue distribution of a screen during normal endoscopy. The thin line represents the characteristic of a hue distribution of a (n-1)-field screen, and the bold line represents the characteristic of a hue distribution of a n-field screen. During normal endoscopy, the field screens show similar hue distributions. The difference between the hues of the fields is small. This is confirmed by the fact that the area of an hatched portion in FIG. 16 is limited.

On the other hand, the histogram shown in FIG. 17 plots a hue distribution of a screen during water supply. In FIG.

17, the thin line represents the characteristic of a hue distribution of a (n-1)-field screen, and the bold line represents the characteristic of a hue distribution of an n-field screen. During water supply, the hue distribution differs greatly from field screen to field screen. The area of a hatched portion in FIG. 17 is large, indicating that a difference between the hues of the fields is large.

Next, the concept of color-misregistered pixel detection will be described in conjunction with FIG. 19.

In FIG. 19, A and B are color difference coordinates indicating chromaticities at the same pixel position of a one-field period before and after. A indicates the chromaticity of an n field, and B, the chromaticity of an (n-1) field. $\Delta\theta$ represents an absolute value of a hue variation from A to B. A shall have a saturation of r. C and Cr shall be specified as decision reference values. Under these conditions, if the two expressions below are satisfied, the pixel is recognized as a color-misregistered pixel.

$$\Delta\theta > C_\theta \quad (1)$$

$$r > Cr \quad (2)$$

Alternatively, color-misregistered pixel detection may be accomplished by recognizing a change of color difference data. FIG. 20 explains this procedure. A and B are color difference coordinates indicating chromaticities at the same pixel position of a one-field period before and after. A represents the chromaticity of an n field. B represents the chromaticity of an (n-1) field. Then, an absolute value of a variation of an R-Y color difference component from A to B shall be expressed as $\Delta$(R-Y), and a variation of a B-Y component, as $\Delta$(B-Y). Then, when the conditional expression (3) or conditional expression (4) is satisfied, the pixel is recognized as a color-misregistered pixel. Herein, Cry and Cby are decision reference values.

$$\Delta(R-Y) > Cry \quad (3)$$

$$\Delta(B-Y) > Cby \quad (4)$$

Instead of the conditional expression (3) or (4), it may be adopted as a condition for color-misregistered pixels that $\Delta$(R-Y)+$\Delta$(B-Y) is larger than a given decision reference value. Alternatively, both the expressions (3) and (4) may be required to be satisfied.

Color difference data R-Y and R-Y of a four-field period before and after are fetched from a four-field memory 55 into a ROM 57. Specified decision reference values are assigned to the expressions (1) and (2), or the expression (3) or (4), then occurrence of color misregistration is checked on pixel basis. If a pixel is not recognized as a color-misregistered pixel, a determination signal is sent so that the color difference data of the pixel read from a line memory 53 are stored in association with the pixel position in a frame memory 54. When a pixel is recognized as a color-misregistered pixel, a determination signal is sent to a selector 56 so that color difference data read from the frame memory 54 will be supplied instead of an output from the line memory 53.

Hue data is fetched as a color misregistration parameter from the ROM 57 into a counter 62. The counter 62 counts the number of pixels hue by hue in fields, and outputs the counts to a CPU 61. The CPU 61 calculates a difference between outputs of the counter 9 in fields for each hue, then adds up the absolute values of the calculated differences. When the sum total is smaller than a set value as shown in FIG. 16, the CPU 61 determines that a normal endoscopic image is acquired, and outputs a select signal for selecting three primary color input signals R, G, and B to a selector 60. When an operator freezes a screen to acquire a still image, a count becomes 0. Therefore, three primary color input signals R, G, and B are selected. On the contrary, when the sum total is larger than the set value, the CPU 61 determines that water supply is under way, designates a water supply mode, and outputs a select signal for selecting an output of a decoder 59 to the selection 60.

In addition, the CPU 61 specifies the water supply mode in the ROM 57. When the water supply mode is specified in the ROM, decision reference values corresponding to $C_\theta$, Cr, Cry, and Cby in the expressions (1) to (4) are made smaller so that even a pixel causing relatively minor color misregistration can be recognized as a color-misregistered pixel. Then, the CPU 61 instructs the selector 56 to select an output of the frame memory 54. As a result, the number of corrected pixels increases and the area of a corrected portion of an image expands.

The CPU 61 may follow other procedure to detect the water supply mode. FIG. 18 shows a hue distribution over a screen during water supply, thus explaining the procedure. During water supply, as indicated with a hatched area in FIG. 18, pixels having the hues of three primary colors; red, green, and blue, and their intermediate hues increase in number. Therefore, the CPU 61 monitors the numbers of pixels having only these specific hues, and thus identifies the water supply mode.

In this case, the counter 62 counts the numbers of pixels having red, green, and blue, and their intermediate hues. The CPU 61 reads the counts for the hues in fields. If the counts exceed predetermined values, the CPU 61 determines that water supply is under way and designates the water supply mode.

Furthermore, the CPU 61 may follow the other procedure to detect the water supply mode. This procedure is based on the fact that the sum total of variations of color differences of pixels for a field increases during water supply. In this case, color difference variations are retrieved as color misregistration parameters on pixel basis from the ROM 57. The counter 62 adds up variations of color differences of pixels for one field, then outputs the sum. The CPU 61 reads the counter output for each field. If the counter value exceeds a predetermined value, the CPU 61 determines that water supply is under way and designates the water supply mode.

As described above, in this embodiment, hue data or color difference data are used to find color-misregistered pixels and detect the cause of the color misregistration. Even when water supply is in progress, a rainbow-colored image will not be produced. When color misregistration due to water supply is detected, color misregistration decision references are changed and a correction area is varied. This permits optimal correction according to the cause of color misregistration.

Figure 21:
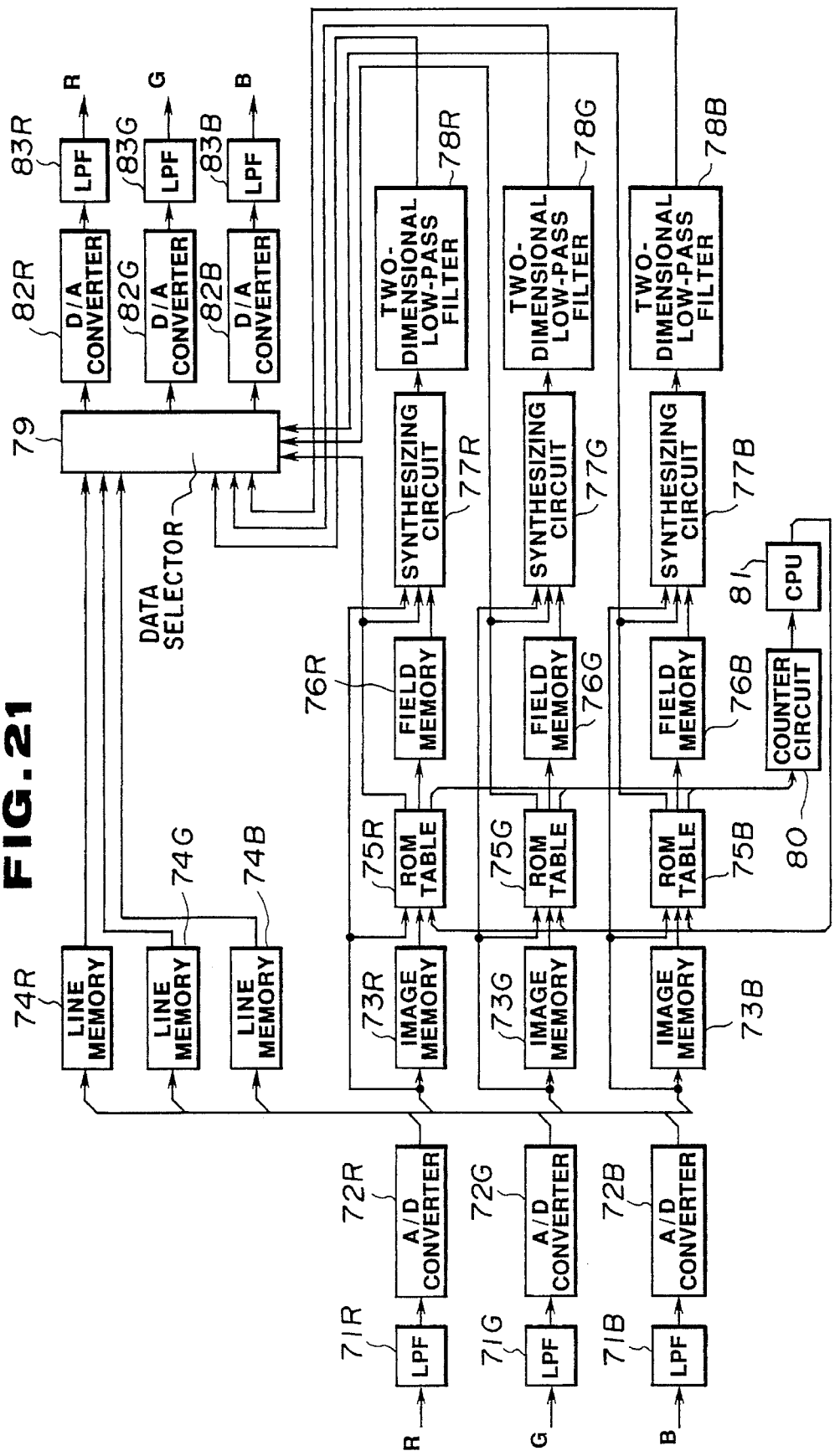
FIG. 21 is an overall block diagram showing a color misregistration easing system of a ninth embodiment.

FIG. 21 shows the ninth embodiment of the present invention, which is an overall block diagram of a color misregistration easing system of the ninth embodiment.

R, G, and B input signals are produced in field sequential mode by an imaging means, which is not shown, divided into frames, then supplied to LPFs 71R, 71G, and 71B. The LPFs 71R, 71G, and 71B restrict the frequencies of the R, G, and B input signals to such an extent that the information of the raw image will not be lost, then output the restricted signals to A/D converters 72R, 72G, and 72B. The A/D converters 72R, 72G, and 72B convert input signals into digital signals, then place the digital signals in image memories 73R, 73G, and 73B, and in line memories 74R, 74G, and 74B. In the line memories 74R, 74G, and 74B, the R, G, and B signals are delayed for a delay time arising in a correction system, then supplied to a data selector 79.

In the image memories 73R, 73G, and 73B, the input R, G, and B data are delayed for a four-field period, then placed in ROM tables 75R, 75G, and 75B. Outputs of the A/D converters 72R, 72G, and 72B are also put in the ROM table 75R, 75G, and 75B. Then, the ROM tables 75R, 75G, and 75B are searched for the quantities of changes of the R, G, and B data of the four-field period before and after. If no change is detected, a consistency detected signal is sent to field memories 76R, 76G, and 76B respectively. When quantities of changes are detected in the ROM tables 75R, 75G, and 75B, the data of the quantities of changes are fetched into a counter circuit 80. At the same time, based on the quantities of changes, a CPU 81 determines a coefficient K for each screen. The coefficient K is placed in the ROM tables 75R, 75G, and 75B, then supplied to synthesizing circuits 77R, 77G, and 77B. In the ROM tables 75R, 75G, and 75B, the coefficient K is subjected to the quantities of changes detected in the image memories 73R, 73G, and 73B, and the A/D converters 72R, 72G, and 72B. The ROM tables 75R, 75G, and 75B pass control from the CPU 81 to a data selector 79 on pixel basis. The outputs of the A/D converters 72R, 72G, and 72B are also placed in the field memories 76R, 76G, and 76B. R, G, and B data of a pixel for which a consistency detected signal has been issued are stored at an address associated with the pixel in the field memories 76R, 76G, and 76B.

The synthesizing circuits 77R, 77G, and 77B receive the R, G, and B data from the A/D converters 72R, 72G, and 72B, and the R, G, and B data from the field memories 76R, 76G, and 76B. The synthesizing circuits 77R, 77G, and 77B synthesize the R, G, and B data according to the coefficient K, then supply the synthesized data to two-dimensional LPFs 78R, 78G, and 78B. The synthesizing circuits 77R, 77G, and 77B have the same configurations as the synthesizing circuits 26A and 26B shown in FIG. 11. The outputs of A/D converters 72R, 72G, and 72B are supplied to multipliers 28, and the outputs of the field memories 76R, 76B, and 76B are supplied to multipliers 29. The coefficient K is supplied to the multipliers 28 and to arithmetic logic units 30 via the ROM tables 75R, 75G, and 75B. On this point, the synthesizing circuits 77R, 77G, and 77B differ from the synthesizing circuits 26A and 26B. The coefficient K is larger than or equal to 0, and smaller than or equal to 1. The two-dimensional LPFs 78R, 78G, and 78B restrict the spatial frequencies of input data to a low band, then supply the restricted data as three primary color correction signals R', G', and B' to the data selector 79.

On the other hand, the data of quantities of changes fetched from the ROM tables 75R, 75G, and 75B are supplied to a counter circuit 80, too. The counter circuit 80 counts the numbers of pixels for quantities of changes of R, G, and B data, and supplies the counter outputs to the CPU 81. Based on the counter outputs of the counter circuit 80, the CPU 81 determines the cause of color misregistration. The CPU 81 varies the coefficient K on a time-series basis according to the cause and occurrence situation of color misregistration, and outputs a control signal for controlling the data selector 79 to the ROM tables 75R, 75G, and 75B respectively according to the determined cause of color misregistration.

The ROM tables 75R, 75G, and 75B pass control to the data selector 79. The data selector 79 selects either R, G, and B input data read from the line memories 74R, 74G, and 74B or three primary color correction signals R', G', and B' sent from the two-dimensional LPFs 78R, 78G, and 78B, then outputs the selected data to D/A converters 82R, 82G, and 82B. Herein, the selection is done on pixel basis in the order of R, G, and B signals. The D/A converters 82R, 82G, and 82B convert the input data into analog signals, then supply the analog signals to LPFs 83R, 83G, and 83B. The LPFs 83R, 83G, and 83B restrict the frequencies of the R, G, and B input signals to a low band, then output the restricted signals.

Next, the operations of the embodiment having the aforesaid configuration will be described with reference to FIG. 12.

R, G, and B signals entering LPFs 71R, 71G, and 71B are restricted to a low band, then supplied to A/D converters 72R, 72G, and 72B. The A/D converters 72R, 72G, and 72B convert the R, G, and B data into digital signals. The digital signals are placed in image memories 73R, 73G, and 73B. In the image memories 73R, 73G, and 73B, the digital signals are delayed for a period in which the R, G, and B signals stored are updated; that is, a four-field period, then supplied.

The R, G, and B data recorded in the image memories 73R, 73G, and 73B. and R, G, and B raw image data are compared using ROM tables 75R, 75G, and 75B. When the ROM tables 75R, 75G, and 75B indicate that data of the four-field period before and after are consistent, color misregistration has not occurred on the R, G, and B axes. Then, a consistency detected signal is sent to field memories 76R, 76G, and 76B respectively. Thereby, the consistent data are written in the field memories 76R, 76G, and 76B. That is to say, the R, G, and B data of a last image acquired before occurrence of color misregistration are stored on pixel basis relative to the R, G, and B axes.

The data of quantities of changes read from the ROM tables 75R, 75G, and 75B are supplied to a counter circuit 80. The counter circuit 80 counts the numbers of pixels for the quantities of changes. A CPU 81 checks the outputs of the counter circuit 80 to identify the cause and quantity of color misregistration. When the results of comparison using the ROM table 75R, 75G, and 75B demonstrate that the quantities of changes are large, a coefficient K sent from the CPU 81 is subjected to the quantities of changes and supplied to the synthesizing circuit 28R, 28G, and 28B via the ROM tables 75R, 75G, and 75B. The synthesizing circuits 28R, 28G, and 28B synthesize the R, G, and B data recorded in field memories 27R, 27G, and 27B before occurrence of color misregistration with the R, G, and B raw data according to the quantities of changes. When the CPU 81 determines that relatively intense color misregistration has occurred due to water supply, the CPU 81 controls the ROM tables 75R, 75G, and 75B, and instructs the data selector 79 to select the three primary color correction signals R', G', and B' sent from two-dimensional LPFs 78r, 78G, and 78B.

In this embodiment similarly to the fifth embodiment, the coefficient K is controlled on a time-series basis. That is to say, when torrential water supply starts, the coefficient K is increased sharply. Then, as shown with a pattern 1 in FIG. 12, the synthetic ratios of R, G, and B data read from field memories 76R, 76G, and 76B are increased sharply. When water supply terminates gradually, the synthetic ratios of the R, G, and B data read from the field memories 76R, 76G, and 76B are reduced gradually as shown with a pattern 2 in FIG. 12. When an imaging device is moved and frames are changed drastically, the synthetic ratios are varied according to a pattern 3 of FIG. 12.

Thereby, when a screen free from color misregistration is switched to a screen having intense color misregistration, or vice versa, the R', G', and B' correction data sent from the synthesizing circuits 77R, 77G, and 77B are transferred from screen to screen smoothly. This results in easy-to-see images.

Furthermore, in this embodiment, two-dimensional LPFs 78R, 78G, and 78G are employed to provide spatially smooth images. The two-dimensional LPFs 78R, 78G, and 78B restrict the horizontal and vertical frequencies of the outputs of the synthesizing circuits 77R, 77G, and 77B to a low band. This smoothens the borders between an area having terrible color misregistration and an area free from color misregistration on the same screen. Thus, natural and easy-to-see images are produced. The three primary color correction signals R', G', and B' sent from the two-dimensional LPFs 78R, 78G, and 78B are supplied to a data selector 79. The data selector 79 is controlled via the ROM tables 75R, 75G, and 75B. For a pixel not causing color misregistration, the data selector 79 selects R, G, and B raw data that are not restricted to a low band and are contained in line memories 74R, 74G. and 74B. For a pixel causing color misregistration, the data selector 79 selects the outputs of the two-dimensional LPFs 78R, 78G, and 78B.

The R, G, and B data sent from the data selector 79 are converted into digital signals by D/A converters 82R, 82G, and 82B, then restricted to a low band by LPFs 83R, 83G, and 83B.

As described above, in this embodiment, detection and correction of color misregistration are carried out using three primary color signals R, G, and B. The embodiment provides the same advantages as the first embodiment, and permits temporal and spatial smoothening correction. Thus, natural correction images are produced.

Figure 22:
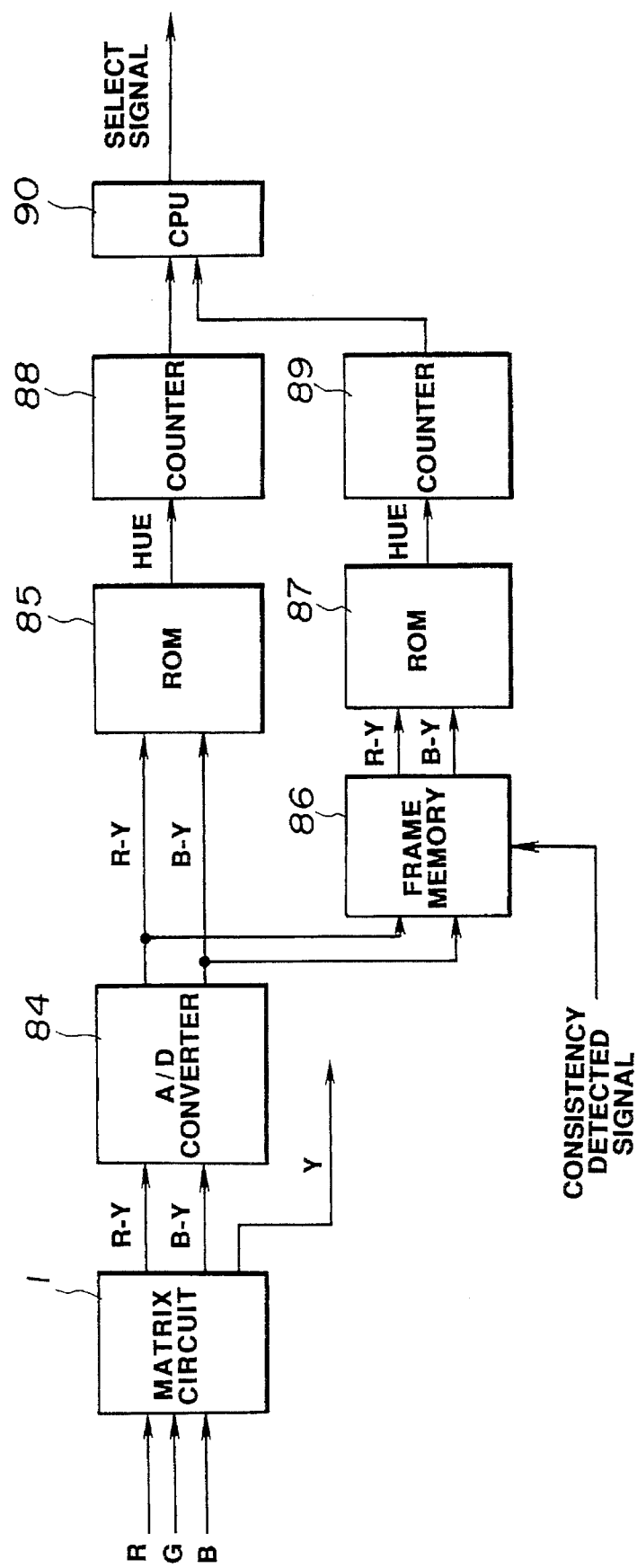
FIG. 22 is a block diagram of a color misregistration easing system of a tenth embodiment.
Figure 25:
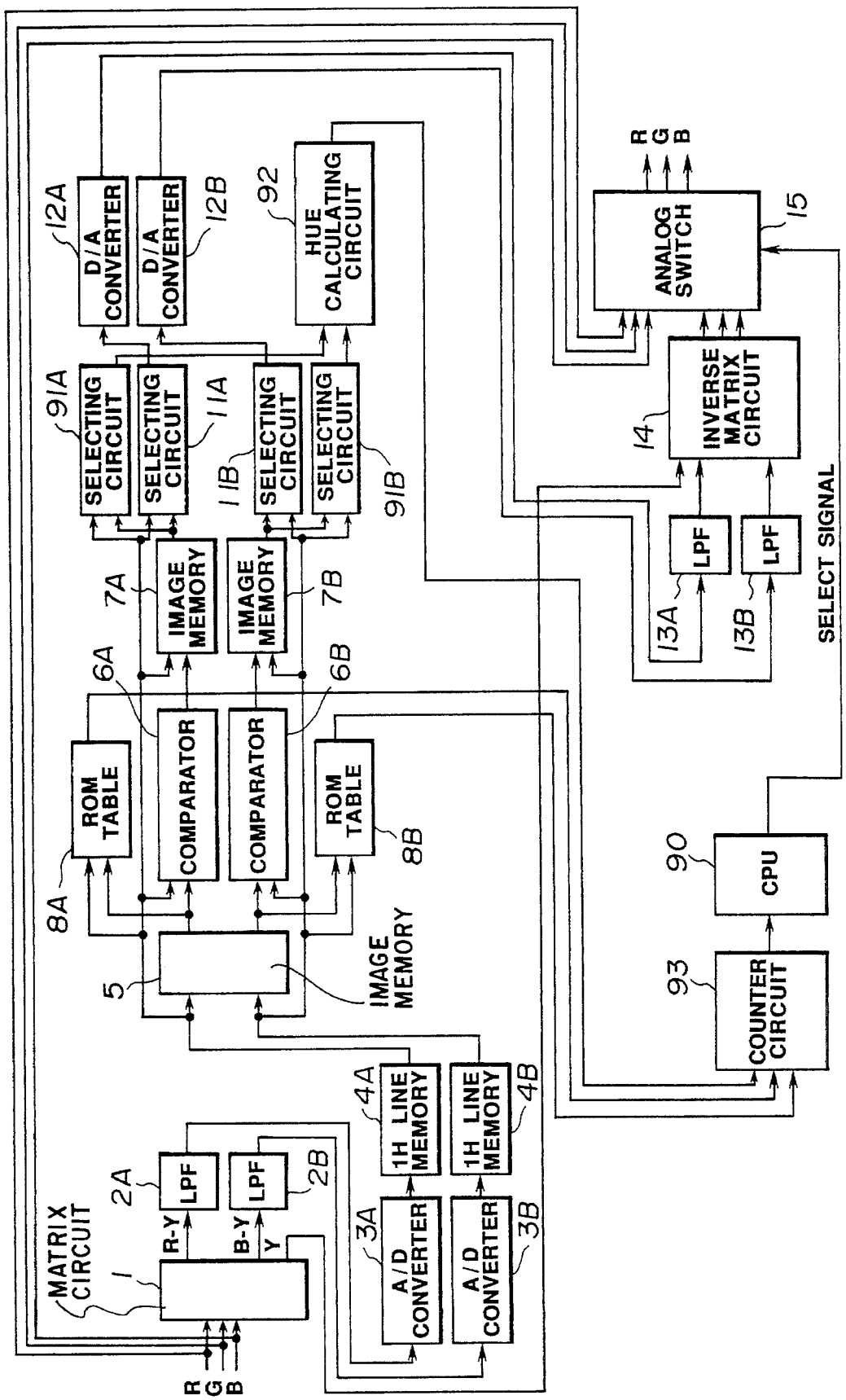
FIG. 25 is a block diagram showing a variant.

FIGS. 22 to 25 relate to the tenth embodiment of the present invention. FIG. 22 is a block diagram of a color misregistration easing system of the tenth embodiment. FIG. 23 are explanatory diagrams showing the color distribution and segments of a normal image and an image produced during water supply. FIG. 24 are explanatory diagrams showing the color distribution and segments of a color bar in still mode and animated mode. FIG. 25 is a block diagram showing a variant. This embodiment provides a circuit for producing a select signal for controlling an analog switch 15 or a selector 60 mentioned in the aforesaid embodiments.

R, G, and B signals originating from a field sequential type endoscope enter a matrix circuit 1. The matrix circuit 1 decomposes the R, G, and B input signals into color difference signals R-Y and B-Y, and a luminance signal Y, then outputs the color difference signals R-Y and B-Y to an A/D converter 84. The A/D converter 84 converts the input data into digital signals, then outputs the digital signals.

A frame memory 86 has the same operation as image memories 7A and 7B or a frame memory 54 in the aforesaid embodiments. A consistency detected signal is supplied on pixel basis. Then, color difference data R-Y and B-Y of pixels not causing color misregistration are selected from the outputs of the A/D converter 84, and stored in the frame memory 86. The color difference data R-Y and B-Y from the A/D converter 84 are placed in a ROM 85, the color difference data R-Y and B-Y read from the frame memory 86 are placed in a ROM 87. Hues associated with the input color difference data R-Y and B-Y are retrieved from the ROMs 85 and 87, then supplied to counters 88 and 89.

Each of the counters 88 and 89 divides hues into multiple hue segments, and counts hues of pixels read from the ROM 85 or 87 in segments. That is to say, the counters 88 and 89 count the numbers of pixels in the same hue segments for each screen. The CPU 90 checks the counter outputs of the counters 88 and 89 to identify the cause of color misregistration.

Next, the operations of this embodiment having the aforesaid configuration will be described.

Color difference signals R-Y and B-Y a matrix circuit 1 decomposes are converted into digital signals by an A/D converter 84. In a ROM 85, the color difference data R-Y and B-Y sent from the A/D converter 84 are transferred into polar coordinates, and thus the hue of the pixel is identified. On the other hand, with a consistency detected signal, the A/D converter 84 puts color difference data R-Y and B-Y of a last image acquired before occurrence of color misregistration in a frame memory 86. In the ROM 87, the color difference data R-Y and B-Y read from the frame memory 86 are transferred into polar coordinates, and thus the hue of the pixel is identified. In short, the hue of a raw image is read on pixel basis from the ROM 85, and the hue data of a still image of a subject is read on pixel basis from the ROM 87.

The counters 88 and 89 count hues read from the ROMs 85 and 87 respectively, and calculates the numbers of pixels in the same hue segments. The CPU 90 checks the counter outputs to identify the cause of color misregistration. FIGS. 23 and 24 are graphs the CPU 90 references to identify a cause of color misregistration. A distribution of chromaticities of all pixels in a screen is identified on a color difference plane.

Pixels of an endoscopic image have, in general, their chromaticities distributed in a narrow range of red tones as shown with a meshed area in FIG. 23a. On the other hand, when a field sequential type electronic endoscope executes water supply, a distribution of chromaticities of pixels expand widely on the color difference plane as shown with a hatched area in FIG. 23a. During water supply, the chromaticity distribution varies drastically on a time-series basis. As described previously, an examining doctor suffers fatigued eyes.

On the other hand, the chromaticity distribution of a color bar chart expands relatively widely as shown with a hatched area in FIG. 24a. When the color bar chart moves to cause color misregistration, as shown with a striped area in FIG. 24a, the chromaticity distribution on the color difference plane varies little. In other words, color misregistration is hardly discernible.

Thus, a chromaticity distribution of a screen on a color difference plane varies depending on the cause of color misregistration. When the color bar chart is moved, quantities of shifts of pixels on the color difference plane are as large as those when water supply is under way. Therefore, whether or not color misregistration is derived from water supply cannot be determined merely by monitoring the quantities of shifts on the color difference plane. Therefore, in this embodiment, the numbers of pixels in the same hue segments are counted to detect the chromaticity distribution of a screen.

For instance, counters 88 and 89 classify hues into six hue segments A to F shown in FIGS. 23b and 24b, then count the numbers of pixels in the same hue segments. A CPU 90 compares the counts of the counters 88 and 89 for each of the segments A to F. In other words, the CPU 90 compares a hue distribution of a raw image with a hue distribution of a last image acquired before occurrence of color misregistration for each of the segments A to F. The CPU 90 calculates a ratio between the counts for each of the segments A to F, then checks the calculated ratios between the numbers of pixels to identify a cause of color misregistration. For instance, when a normal image is switched to an image produced during water supply or other image with conspicuous color misregistration, hue distribution varies drastically at the occurrence of color misregistration. Therefore, the ratios between the numbers of pixels become relatively large. On the contrary, when inconspicuous color misregistration occurs, hue distribution varies little at the occurrence of color misregistration. Therefore, the ratios between the numbers of pixels become relatively small. The CPU 90 produces a select signal depending on whether the ratio between each pair of the numbers of pixels exceeds a set value.

FIG. 25 is a block diagram showing a variant. In FIG. 25, components identical to those in FIG. 1 are assigned the same numerals. The description will be omitted.

In this variant, hue calculation for a raw image and hue calculation for a last image are performed in a time-sharing environment. This results in shrunk circuitry and reduced cost. To be more specific, selecting circuits 91A and 91B, which are based on time sharing, supply color difference data R-Y and B-Y of a raw image read from 1H line memories 4A and 4B and color difference data R-Y and B-Y of a last image read from image memories 7A and 7B to a hue calculating circuit 92. The hue calculating circuit 92 uses color difference data R-Y and B-Y of a raw image to calculate a hue, then outputs the hue to a counter circuit 93. The hue calculating circuit 92 uses color difference data R-Y and B-Y of a last image to calculate a hue, then outputs the hue to the counter circuit 93. The counter circuit 93 plays the roles of the counter circuit 9 of FIG. 1 as well as the counters 88 and 89 of FIG. 22, then provides a CPU 90 with the counter outputs.

The other components and the operation of the variant are identical to those of the tenth embodiment. In this variant, the data of a hue distribution of a raw image is acquired every other field. Even when the cause of color misregistration is identified based on the data of a hue distribution acquired every other field, no problem occurs.

In the tenth embodiment, when a ratio between hue variances is calculated, a cause of color misregistration can be identified with higher precision. A hue variance V is given by the following expression (5):

$$V=\Sigma(xi-x)^2/n-1 \quad (5)$$

where, xi represents a hue of a pixel, x, an average hue, and n, the number of pixels.

A CPU 90 calculates a ratio of a hue variance V1 of a raw image to a hue variance V2 of a last image F (V1/V2) according to the expression (5). If the hue variance ratio F is smaller than 1, the CPU 90 outputs a select signal for outputting R, G, and B signals of a raw image. If the ratio F is larger than 1 (F<1 to 3 or larger), the CPU 90 outputs a select signal for outputting three primary color correction signals R', G', and B'.

As described above, this embodiment makes it possible to distinguish conspicuous color misregistration from inconspicuous color misregistration, which cannot be done by merely monitoring a distance of a shift on a color difference plane.

Figure 26:
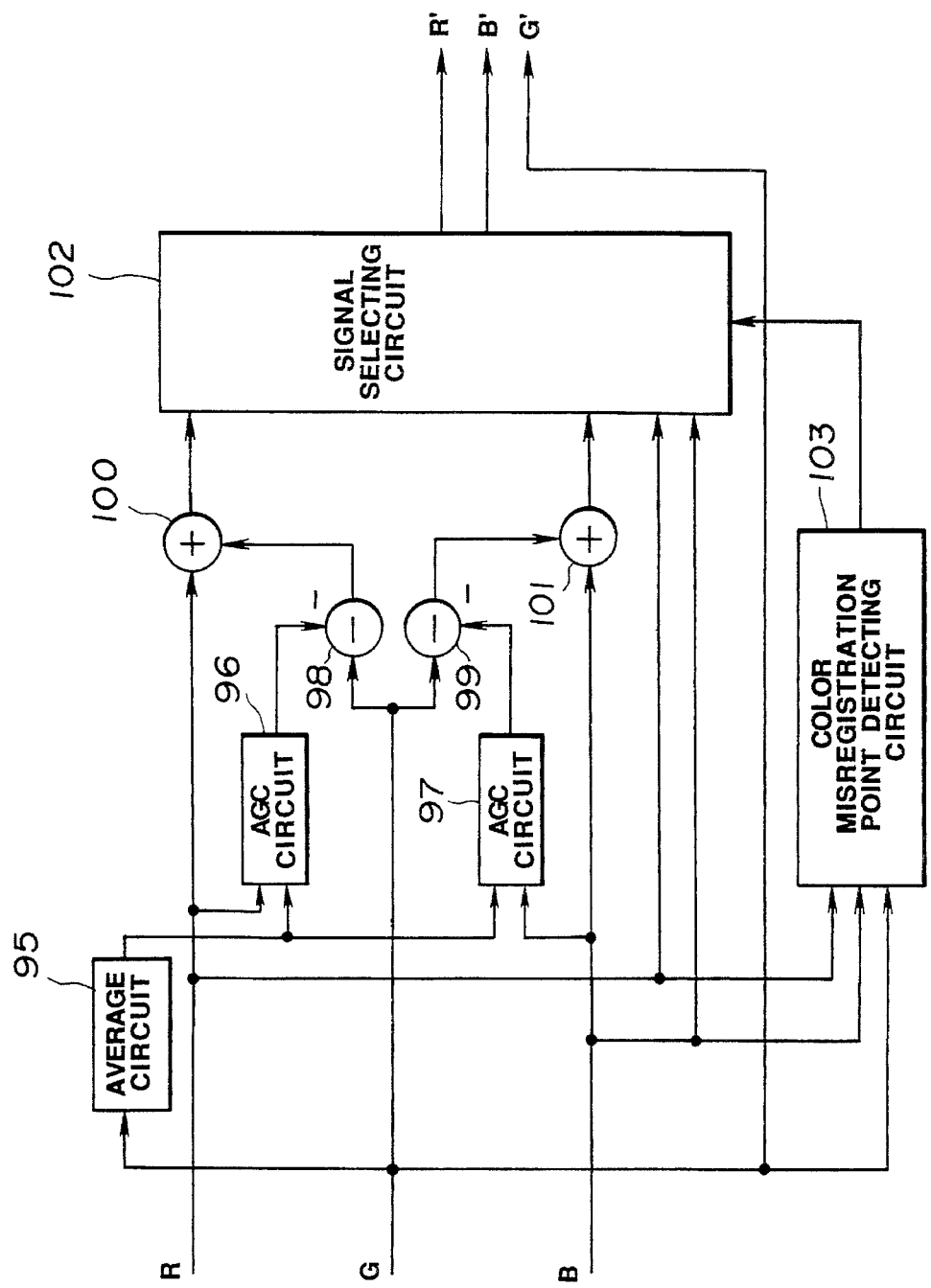
FIG. 26 is a block diagram showing a color misregistration corrector for a color misregistration easing system of an eleventh embodiment.

FIGS. 26 to 30 relate to the eleventh embodiment of the present invention. FIG. 26 shows a color misregistration corrector for a color misregistration easing system according to the eleventh embodiment. FIGS. 27 to 30 show waves representing the operations of the system shown in FIG. 26.

A G signal of R, G, and B input signals originating from a field sequential type imaging device enters an average circuit 95. The R and B input signals enter AGC circuits 96 and 97 respectively. The average circuit 95 calculates an average level of the G signal, controls the AGC circuits 96 and 97 according to the average level of the C signal, and adjusts the levels of the R and B signals so that the levels will agree with the level of the input C signal. The outputs of the AGC circuits 96 and 97 enter subtractors 98 and 99 respectively. The subtractors 98 and 99 also receive the G input signal, and thus calculate a difference of the level-adjusted R signal from the input G signal and a difference of the level-adjusted B signal from the input G signal. Then, the calculated differences are supplied to adders 100 and 101. That is to say, the subtractors 98 and 99 use the C signal as a reference to detect color-misregistered contour components attributable to the level shifts of R, G, and B input signals produced by field sequential imaging in the order of R, G, and B.

The adders 100 and 101 are also provided with R and B input signals. The adders 100 and 101 add the outputs of the subtractors 98 and 99 and the R and B input signals, then supply the results to a signal selecting circuit 102. That is to say, color-misregistered contour components are subtracted from the R and B input signals, then the subtracted signals are supplied to the signal selecting circuit 102.

On the other hand, the R, G, and B input signals enter a color misregistration point detecting circuit 103, too. When the color misregistration point detecting circuit 103 learns a color-misregistered point from the R, G, and B input signals, the detecting circuit 103 outputs a detected signal to the signal selecting circuit 102. When color misregistration is detected, the signal selecting circuit 102 supplies the outputs of the adders 100 and 101 as R and B correction signals according to the timing of the color misregistration detected signal. When color misregistration is not detected, the R and B input signals are supplied as they are. The outputs of the signal selecting circuit 102 and the G input signal are synthesized to provide three primary color correction signals R', G', and B'.

Next, the operations of the embodiment having the aforesaid configuration will be described in conjunction with an example of a video signal.

Figure 27A:
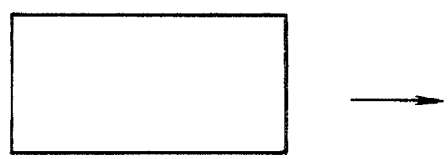
FIGS. 27(a–d) to 30 show waves representing operations of the system.
Figure 27B:
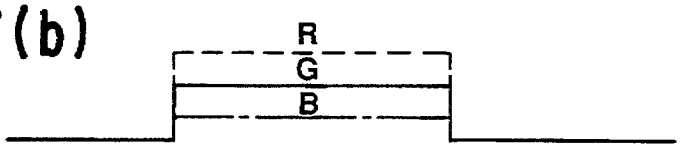
Figure 27C:
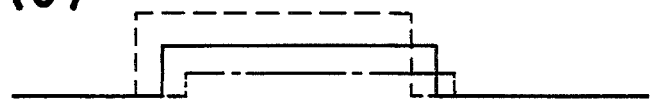
Figure 27D:
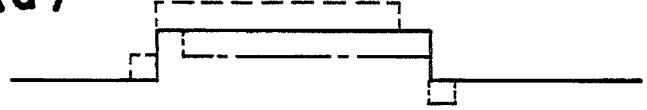
Figure 28:
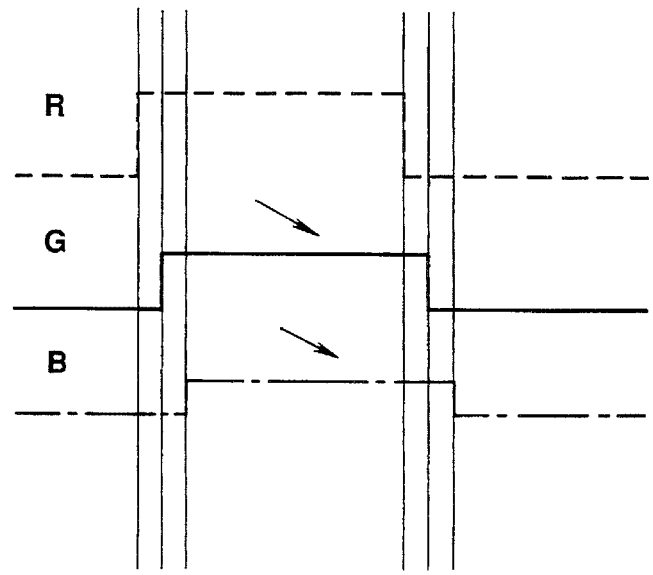

Assume that a rectangular object shown in FIG. 27a is imaged. The levels of R, G, and B signals produced by imaging the rectangular object shall diminish in the order of R, G, and B signals as indicated with a dashed line, a solid line, and a dot-dash line in FIG. 27b. When the rectangular subject moves in the arrow direction in FIG. 27a, a field sequential type electronic endoscope, which acquires R, G, and B images on a time-series basis, acquires the R, G, and B image signals at different times as shown in FIGS. 28 and 27c. Consequently, color misregistration occurs on contours.

An average circuit 95 calculates an average of a G input signal, and controls the gains for AGC circuits 96 and 97 according to the average so that the levels of the R, G, and G signals will agree one another as shown in FIG. 29a. A subtractor 98 subtracts a level-adjusted R signal from the G input signal to produce a signal shown in FIG. 29b. The signal represents a color-misregistered contour component of the R signal that is identified relative to the G signal. The subtractor 99 subtracts a level-adjusted B signal from the input G signal to produce a signal shown in FIG. 29c. This signal represents a color-misregistered contour component of the B signal that is identified relative to the G signal. The adder 100 adds the R input signal and the output of the subtractor 98 to produce a signal R' indicated with a dashed line in FIG. 30, then outputs the signal R' to the signal selecting circuit 102. The adder 101 adds the B input signal and the output of the subtractor 99 to produce a signal B' indicated with a dot-dash line in FIG. 30, then outputs the signal B' to the signal selecting circuit 102.

Thus, the signal selecting circuit 102 inputs R and B signals whose color-misregistered contour components have been corrected. When the color misregistration point detecting circuit 103 reports occurrence of color misregistration, the signal selecting circuit 102 outputs the outputs of the adders 100 and 101. Then, the outputs of the signal selecting circuit 102 and the C input signal are synthesized to provide three primary color correction signals R, G, and B shown in FIG. 27d. As apparently seen in comparison between FIGS. 27c and 27d, the corrected signal provides a subject image in which the color misregistration on the contours is eased.

As described above, this embodiment permits real-time (pixel-based) color misregistration correction using a low-cost circuitry.

Figure 31:
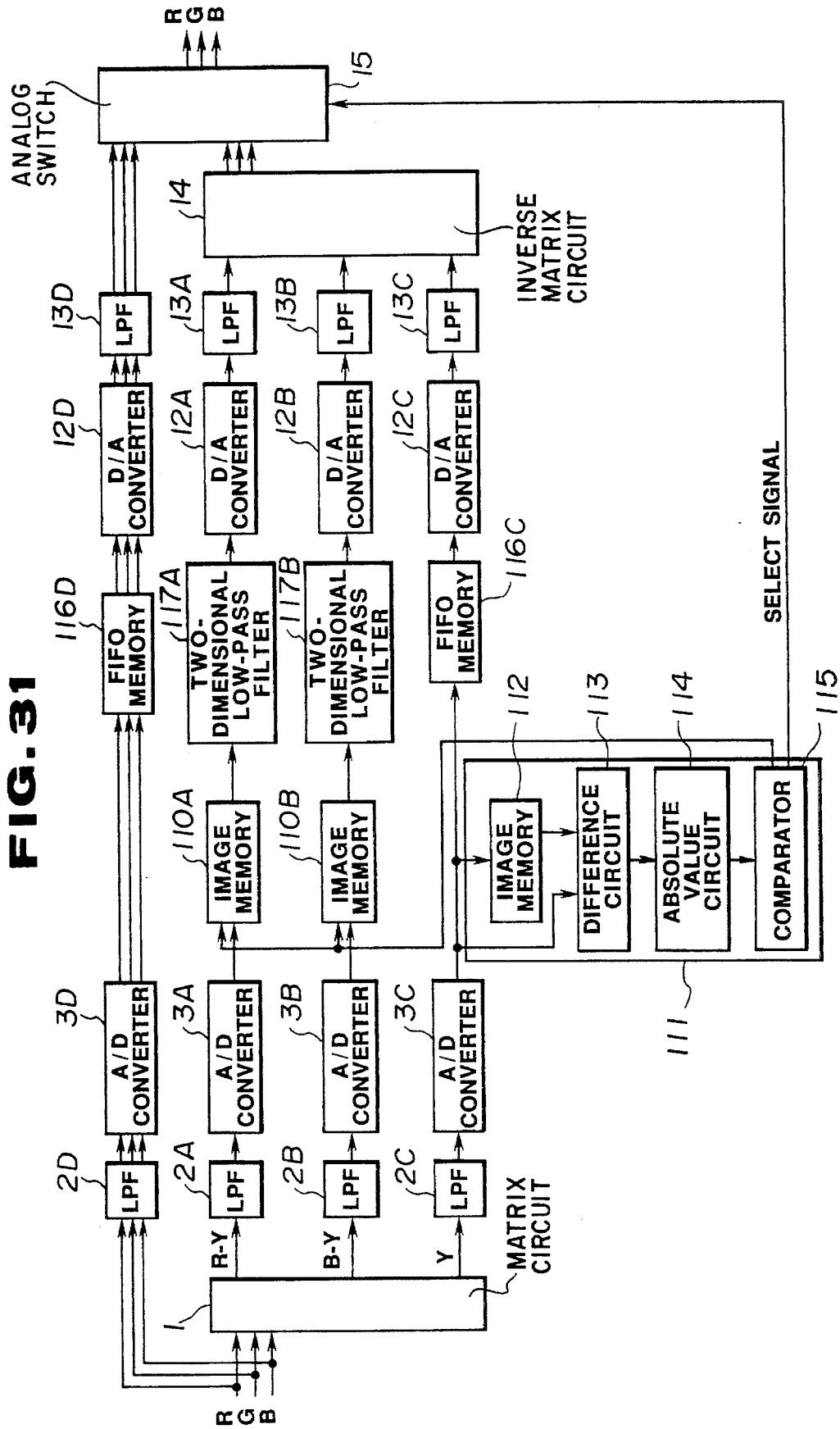
FIG. 31 is a block diagram showing a color misregistration easing system according to a twelfth embodiment of the present invention.

FIG. 31 is a block diagram showing a color misregistration easing system according to the twelfth embodiment of the present invention. In FIG. 31, components identical to those in FIG. 1 are assigned the same numerals. The description will be omitted.

In this embodiment, movement detection is executed to detect a movement of a subject image derived from a moving subject or scope and a change in a subject image derived from zooming (event leading to color misregistration), and thus color misregistration correction points are detected. In the aforesaid embodiments, a difference between signal delay times of a luminance signal and color signals employed for correction is not taken into consideration. A difference between signal delay times of three primary color correction signals R', G', and B', and three primary color input signals R, G, and B is not fully dealt with. This embodiment tackles the signal delay time arising in a correction system.

R, G, and B input signals are supplied to a matrix circuit 1 and to an LPF 2D. Color difference signals R-Y and B-Y the matrix circuit 1 has decomposed pass through LPFs 2A and 2B, and A/D converters 3A and 3B, then enter image memories 110A and 110B. On the other hand, a luminance signal Y sent from the matrix circuit 1 enters an LPF 2C. The LPF 2C restricts the band of the luminance signal Y to a low frequency, then outputs the band-restricted signal to an A/D converter 3C. The A/D converter 3C converts the luminance signal into digital data, and outputs the digital data to a movement detecting circuit 111 and a FIFO memory 116C.

The movement detecting circuit 111 comprises an image memory 112, a difference circuit 113, an absolute value circuit 114, and a comparator 115. The luminance data Y sent from the A/D converter 3C is put in the image memory 112 and supplied to the difference circuit 113. In the image memory 112, the luminance data is delayed for a one-frame period. Then, the luminance data is supplied to the difference circuit 113. The difference circuit 113 inputs the luminance data Y of the one-frame period before and after, calculates a difference between the two inputs, then outputs the difference to the absolute value circuit 114. The absolute value circuit 114 calculates an absolute value of the difference sent from the difference circuit 113, then outputs the absolute value to the comparator 115. The comparator 115 compares the signal sent from the absolute value circuit 114 with a set value in pixels. More particularly, when the absolute value of the difference between the luminance data of the one-frame period before and after is not 0 or a very small value, the comparator 115 determines that an event leading to color misregistration has occurred. Then, the comparator 115 outputs an inconsistency signal to the image memories 110A and 110B respectively. When the absolute value of the difference is 0 or a very small value, a consistency detected signal is sent to the image memories 110A and 110B respectively. When the absolute value of the difference exceeds the set value, the comparator 115 determines that the cause of color misregistration is water supply, then outputs a select signal for selecting an output of an inverse matrix circuit 14 to an analog switch 15. When the absolute value of the difference is smaller than the set value, a select signal for selecting an output of an LPF 3D is sent to the analog switch 15.

Each of the image memories 110A and 110B is formed with a dual-port memory. With input of consistency detected signals, color difference data R-Y and B-Y sent from the A/D converters 3A and 3B are stored at addresses associated with a pixel position in the the image memories 110A and 110B. At the same time, the color difference data R-Y and B-Y sent from the A/D converters 3A and 3B are fetched from the image memories 110A and 110B into two-dimensional LPFs 117A and 117B. When the comparator 115 outputs an inconsistency signal to the image memories 110A and 110B respectively, it is determined that an event leading to color misregistration has occurred. The color difference data R-Y and B-Y fetched from addresses associated with the pixel position in the image memories 110A and 110B are supplied into the two-dimensional LPFs 117A and 117B, but the color difference data sent from the A/D converters 3A and 3B are not. The two-dimensional LPFs 117A and 1178 restrict the spatial frequencies of the input data to a low band, and output the restricted data to D/A converters 12A and 12B.

In a FIFO memory 116C, input luminance data is delayed for a time covering the time required for processing color difference signal data R-Y and B-Y, then supplied to a D/A converter 12C. The D/A converter 12C converts the luminance data into an analog signal, and supplies the analog signal to an LPF 13C. The LPF 13C restricts the frequency of the input luminance signal Y and outputs the restricted signal to an inverse matrix circuit 14.

On the other hand, the LPF 2D restricts the frequencies of the input R, G, and B signals to a low band, and supplies the restricted signals to the A/D converter 3D. The A/D converter 3D converts the analog signals R, G, B into digital signals, then places the digital signals in the FIFO memory 116D. In the FIFO memory 116D, the R, G, and B data of a raw image are delayed for a time covering the time required for generating three primary color correction signals R', G', and B'. Then, the delayed data are supplied to the D/A converter 12D. The D/A converter 12D converts the R, G, and B data into analog signals R, G, and B, then supplies the analog signals to the LPF 13D. The LPF 13D restricts the frequencies of the R, G, and B signals to a low band, then outputs the restricted signals to the analog switch 15.

In the embodiment having the aforesaid configuration, R, G, and B input signals pass through an LPF 2D and an A/D converter 3D, then enter a FIFO memory 116D. In the FIFO memory 116D, the R, G, and B signals are timed or delayed. Then, the R, G, and B signals pass through an D/A converter 12D and an LPF 13D, then reach an analog switch 15. A matrix circuit 1 decomposes the R, G, and B input signals into color difference signals R-Y and B-Y and a luminance signal Y. The frequencies of the color difference signals R-Y and B-Y and the luminance signal Y are restricted by LPFs 2A, 2B, and 2C. Then, the restricted color difference signals R-Y and B-Y and the luminance signal Y are converted into digital signals by A/D converters 3A, 3B, and 3C. The color difference data R-Y and B-Y are placed in image memories 110A and 110B. The luminance data Y is placed in a FIFO memory 116C and timed, then supplied to an inverse matrix circuit 14 via a D/A converter 12C and an LPF 13C.

In this embodiment, the luminance data Y is supplied to a movement detecting circuit 111, then an event leading to color misregistration is detected. That is to say, a difference circuit 113 calculates a difference between luminance data Y of a one-frame period before and after that are an input and an output of an image memory 112. The difference value is converted into an absolute value by an absolute value circuit 114, then supplied to a comparator 115. The comparator 115 compares the absolute value of the difference with a set value on pixel basis. When the absolute value of the difference is 0 or a very small value, the comparator 115 outputs a consistency detected signal to the image memories 110A and 110B respectively. The color difference data R-Y and B-Y of the pixel are stored in the image memories 110A and 110B. Then, the color difference data R-Y and B-Y of the pixel are fetched from the image memories 110A and 110B into two-dimensional LPFs 117A and 117B. On the contrary, when the absolute value of the difference is larger than 0 or the very small value, the comparator 115 determines that an event leading to color misregistration has occurred and data of a misregistered-color pixel has been entered, then outputs an inconsistency signal to the image memory 110A. Thereby, the color difference data R-Y and B-Y of the pixel existent in the image memories 110A and 110B are supplied. Then, color difference data of a last image acquired before occurrence of color misregistration is supplied on pixel basis. This permits pixel-based correction of color misregistration.

The spatial frequencies of the outputs of image memories 110A and 110B are restricted by two-dimensional LPFs 117A and 117B. This suppresses a drastic change of colors of pixels. The outputs of the two-dimensional LPFs 117A and 117B are converted into analog signals by D/A converters 12A and 12B. The frequencies of the outputs are restricted by LPFs 13A and 13B. Then, the restricted signals are supplied to an inverse matrix circuit 14. The inverse matrix circuit 14 synthesizes the input color difference signals R-Y and B-Y and the luminance signal Y to produce three primary color correction signals R', G', and B', then outputs the signals R', G', and B' to an analog switch 15. Under the control of the comparator 115, the analog switch 15 selects an output of the inverse matrix circuit 14 when color misregistration is intense, and selects an output of the LPF 13D when color misregistration is indiscernible.

Apparently, this embodiment provides the same advantages as the aforesaid embodiments. In this embodiment, the delay time arising in signal processing system is adjusted. Thereby, color misregistration correction can be done with higher precision.

In the present invention, it will be apparent that a wide range of different embodiments can be formed based on this invention without departing from the spirit and scope of the invention. This invention will be restricted to the appended claims but not be limited to any particular embodiment.

What is claimed is:

1. A color misregistration easing system, comprising:

a detecting means for using a color image signal originating from an imaging means for imaging a subject in field sequential mode to detect color misregistration or an event leading to color misregistration either on a pixel basis or a block basis; and a correcting means for selectively correcting color misregistration of said color image signal either on a pixel basis or a block basis based on whether the detection result provided by said detecting means indicates color misregistration or the event leading to color misregistration has occurred either on a pixel basis or on a block basis, and providing an output.

2. A color misregistration easing system, comprising:

a calculating means for using a color image signal originating from an imaging means for imaging a subject in field sequential mode to calculate color misregistration or an event leading to color misregistration either on a pixel basis or a block basis;

a correcting means for selectively correcting color misregistration of said color image signal either on a pixel basis or a block basis based on whether the result of the calculation provided by said calculating means indicates that color misregistration or the event leading to color misregistration has occurred either on a pixel basis or on a block basis, and providing an output;

a means for detecting a distribution of color misregistration of a screen using the result of calculation provided by said calculating means; and a switching means for selectively outputting an output of said correcting means or said color image signal according to the detection result provided by said means for detecting a distribution.

3. A color misregistration easing system, comprising:

a detecting means for using a color image signal originating from an imaging means for imaging a subject in field sequential mode to detect color misregistration or an event leading to color misregistration either on a pixel basis or a block basis;

a storing means for holding said color image signal associated with either said pixel or said block that is determined not to have caused color misregistration according to the result of detection provided by said detecting means; and a correcting means for selectively correcting color misregistration of said color image signal either on a pixel basis or a block basis based on whether the detection result provided by said detecting means indicates that color misregistration or the event leading to color misregistration has occurred either on a pixel basis or on a block basis.

4. A color misregistration easing system according to claim 3 wherein said correcting means includes a means for producing a signal for correcting color misregistration using a color image signal held in said storing means, and a synthesizing means for synthesizing an output of said means for producing a signal with said color image signal and varying a synthetic ratio of the synthesized signals.

5. A color misregistration easing system according to claim 3 wherein said correcting means selectively outputs either said color image signal or a signal stored in said storing means either on a pixel basis or a block basis according to the detection result provided by said detecting means.

6. A color misregistration easing system according to claim 3 wherein said correcting means synthesizes said color image signal with a signal stored in said storing means either on a pixel basis or a block basis at a synthetic ratio based on the detection result provided by said detecting means.

7. A color misregistration easing system, comprising:

a calculating means for using a color image signal originating from an imaging means for imaging a subject in field sequential mode to calculate color misregistration or an event leading to color misregistration either on a pixel basis or a block basis;

a correcting means for detecting and selectively correcting color misregistration of said color image signal either on a pixel basis or a block basis based on whether the calculation result provided by said calculating means indicates that color misregistration or the event leading to color misregistration has occurred either on a pixel basis or on a block basis, then providing an output;

a means for detecting a distribution of color misregistration of a screen in the result of calculation said calculating means provides;

a switching means for selectively outputting either an output of said correcting means or said color image signal according to the detection result provided by said means for detecting a distribution; and a control means for controlling a color misregistration detection level for said correcting means according to the detection result provided by said means for detecting a distribution.

8. A color misregistration easing system, comprising:

an encoding means for decomposing a color image signal originating from an imaging means for imaging a subject in field sequential mode into a luminance signal and color signals;

a detecting means for using color signals sent from said encoding means to detect color misregistration or an event leading to color misregistration either on a pixel basis or a block basis; and a correcting means for selectively correcting color misregistration of said color image signal either on a pixel basis or a block basis based on whether the detection result provided by said detecting means indicates that color misregistration or the event leading to color misregistration has occurred either on a pixel basis or on a block basis, and providing an output.

9. A color misregistration easing system according to claim 8 wherein said detecting means detects color misregistration or an event leading to color misregistration either on a pixel basis or a block basis according to changes of color signals of given screens before and after.

10. A color misregistration easing system according to claim 8 or 9 wherein said detecting means uses color difference signals as said color signals.

11. A color misregistration easing system according to claim 8 wherein said detecting means uses a delaying means for delaying said color signals for a period of screens and a means for calculating a difference between an input and an output of said delaying means and recognizes when the calculated difference exceeds a set value, and thus detects color misregistration or an event leading to color misregistration either on a pixel basis or a block basis.

12. A color misregistration easing system, comprising:

a calculating means for using a color image signal originating from an imaging means for imaging a subject in field sequential mode to calculate color misregistration or an event leading to color misregistration either on a pixel basis or a block basis;

an encoding means for decomposing said color image signal into a luminance signal and color signals;

a storing means for storing said color signals associated with either said pixel or said block that is determined not to have caused color misregistration according to the calculation result provided by said calculating means; and a correcting means for selectively correcting color signals sent from said encoding means causing color misregistration either on a pixel basis or a block basis according to whether the color signals held in said storing means indicate that color misregistration or the event leading to color misregistration has occurred either on a pixel basis or on a block basis, and using the corrected color signals and the luminance signal sent from said encoding means to produce and output a color image correction signal.

13. A color misregistration easing system according to claim 12 wherein said correcting means synthesizes color signals sent from said encoding means with color signals held in said storing means at synthetic ratios based on the result of calculation provided by said calculating means, and produces color signals that have been corrected either on a pixel basis or a block basis.

14. A color misregistration easing system according to claim 12 wherein said correcting means uses color difference signals as color signals.

* * * * *